(12) United States Patent
Shake et al.

(10) Patent No.: US 7,200,328 B2
(45) Date of Patent: Apr. 3, 2007

(54) METHOD AND SYSTEM FOR DETERMINING ORIGIN OF OPTICAL SIGNAL QUALITY DEGRADATION

(75) Inventors: Ippei Shake, Yokohama (JP); Hidehiko Takara, Yokosuka (JP); Kentaro Uchiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 844 days.

(21) Appl. No.: 10/173,752

(22) Filed: Jun. 19, 2002

(65) Prior Publication Data

US 2003/0011837 A1    Jan. 16, 2003

(30) Foreign Application Priority Data

Jul. 13, 2001    (JP) .............................. 2001-214212

(51) Int. Cl.
*H04B 10/08* (2006.01)
(52) U.S. Cl. .............................. 398/10; 398/17; 398/26; 398/27
(58) Field of Classification Search ............ 398/10–21, 398/26–28, 30
See application file for complete search history.

(56) References Cited

U.S. PATENT DOCUMENTS

| | | | |
|---|---|---|---|
| 2002/0044322 A1* | 4/2002 | Blumenthal et al. | 359/161 |
| 2002/0048060 A1* | 4/2002 | Laham et al. | 359/110 |
| 2002/0122220 A1* | 9/2002 | Robinson et al. | 359/110 |

FOREIGN PATENT DOCUMENTS

| | | |
|---|---|---|
| EP | 0 920 150 A2 | 6/1999 |
| JP | HEI 11-118614 | 4/1999 |
| JP | HEI 11-223575 | 8/1999 |
| JP | 2000-001047 | 7/2001 |
| JP | 2000-012240 | 7/2001 |

OTHER PUBLICATIONS

Shake et al., "Optical Signal Quality Monitor Using Averaged Q-factor Evaluation with Amplitude Histograms," IEICE Technical Research Report, vol. 99, No. 605, The Institute of Electronics and Information Communication Engineers (published Feb. 4, 2000), pp. 55 to 60.

Shake et al., "Bitrate Flexible Optical Signal Quality Monitoring Using Amplitude Histograms Evaluation," 2000 IEICE Communication Society Transactions, vol. 2 (issued Sep. 7, 2000), pp. 492-493.

(Continued)

*Primary Examiner*—Dalzid Singh
(74) *Attorney, Agent, or Firm*—Finnegan, Henderson, Farabow, Garrett & Dunner, LLP

(57) ABSTRACT

A monitoring system includes first and second evaluation sections for obtaining an averaged Q-factor parameter and a waveform distortion parameter from an optical signal amplitude histogram collected from optical signals under measurement. The monitoring system further includes a third evaluation section for determining both averaged Q-factor parameter and waveform distortion parameter, and for making a decision as to whether the main factor of the optical signal quality degradation is waveform distortion or not by comparing the averaged Q-factor parameter and waveform distortion parameter with their initial values or initial characteristics which are obtained when no optical signal quality degradation is present.

30 Claims, 20 Drawing Sheets

OTHER PUBLICATIONS

Shake et al., "Optical Signal Quality Monitor Using Averaged Q-factor Evaluation of Signal with Dispersion in Transmission Fiber," 1999 IEICE Communication Society Transactions, vol. 2 (issued: Aug. 16, 1999). p. 251.

Shake et al., "Optical Signal Quality Monitoring Method Based on Averaged Q-factor Measurement Optical Sampling," 1999 IEICE General Convention Transactions, Communication (2) (issued Mar. 8, 1999), p. 529.

Japanese Patent Office Official Notice of Rejection for Application No. 2002-172035, mailed Dec. 14, 2004.

Ippei Shake, et al., "Quality Monitoring of Optical Signals Influenced by Chromatic Dispersion in a Transmission Fiber Using Averaged Q-Factor Evaluation," IEEE Photonics Technology Letters, vol. 13, No. 4, Apr. 2001, pp. 385-387.

I. Shake, et al., "Optical Signal Quality Monitoring Method Based on Optical Sampling," Electronics Letters, Oct. 29, 1998, vol. 34, No. 22 (2 pages).

N. Hanik, et al., "Application of Amplitude Histograms to Monitor Performance of Optical Channels," Electronics Letters, Mar. 4, 1999, vol. 35, No. 5 (2 pages).

K. Mueller, et al., "Application of Amplitude Histograms for Quality of Service Measurements of Optical Channels and Fault Identification," ECOC 98, Sep. 20-24, 1998, Madrid, Spain, XP-000887223, pp. 707-708.

European Patent Office Search Report for Application No. 02254429.0, Feb. 16, 2004.

European Patent Office Action issued in European Patent Application No. 02254429.0, May 3, 2005.

"Subpicosecond Optical Sampling Gate," IBM Technical Disclosure Bulletin, New York, vol. 29, No. 5, Oct. 5, 1986, pp. 1968-1969.

Shake, I. et al., "Quality Monitoring of Optical Signals Influenced by Chromatic Dispersion in a Transmission Fiber Using Averaged Q-Factor Evaluation," IEEE Photonics Technology Letters, IEEE Inc., New York, vol. 13, No. 4, Apr. 2001, pp. 385-387.

"Overhead Bytes Description", ITU-T, Recommendation G.707 pp. 51-66, (Mar. 1996).

Takara, H. et al., "100 Gbit/S Optical Signal Eye-Diagram Measurement With Optical Sampling Using Organic Nonlinear Optical Crystal", Electronics Letters, vol. 32, No. 24, pp. 2256-2258, (Nov. 1996).

Marcuse, D. "Derivation of Analytical Expressions for the Bit -Error Probability in Lightwave Systems with Optical Amplifiers", IEEE Journal of Lightwave Technology, vol. 8, No. 12, pp. 1816-1823, (Dec. 1990).

Shake, I. et al., "Determination of the Origin of BER Degradation Utilizing Asynchronous Amplitude Histograms", Communications Society Conference of IEICE, pp. II-560-II-561 (2001).

Shake, I. et al., "Optical Performance Monitoring and Control", (OFC), pp. 19-21(Mar. 19, 2002).

* cited by examiner

ASYNCHRONOUS AMPLITUDE HISTOGRAM OBTAINED FROM FIXED TIME ASYNCHRONOUS EYE PATTERN

FIXED TIME ASYNCHRONOUS EYE PATTERN BY ELECTRICAL SAMPLING OR OPTICAL SAMPLING

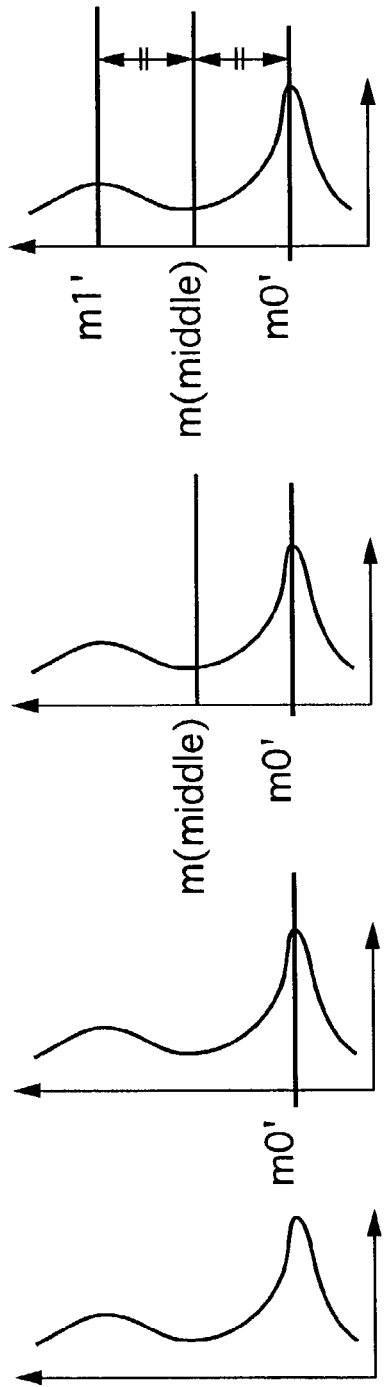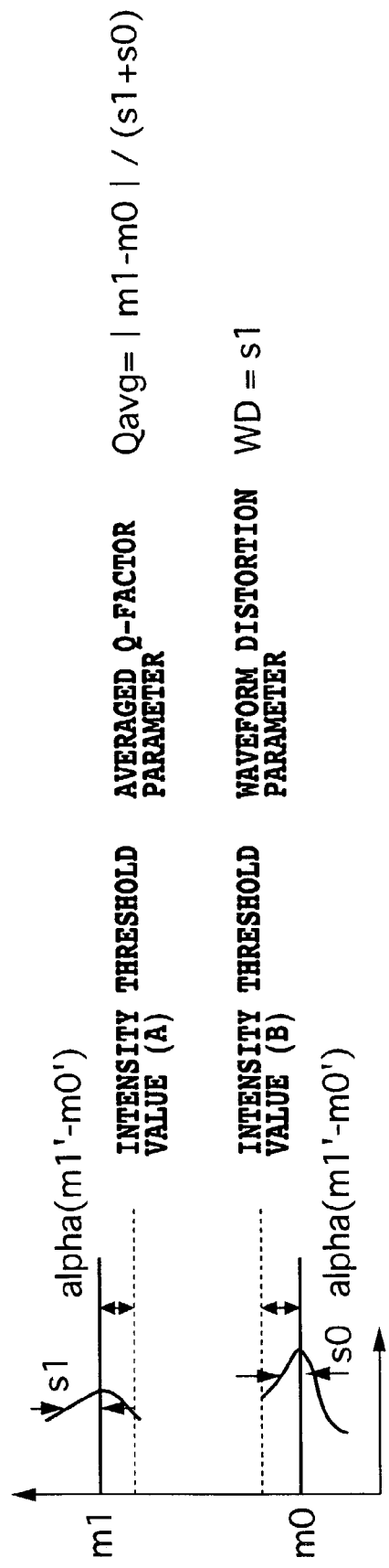

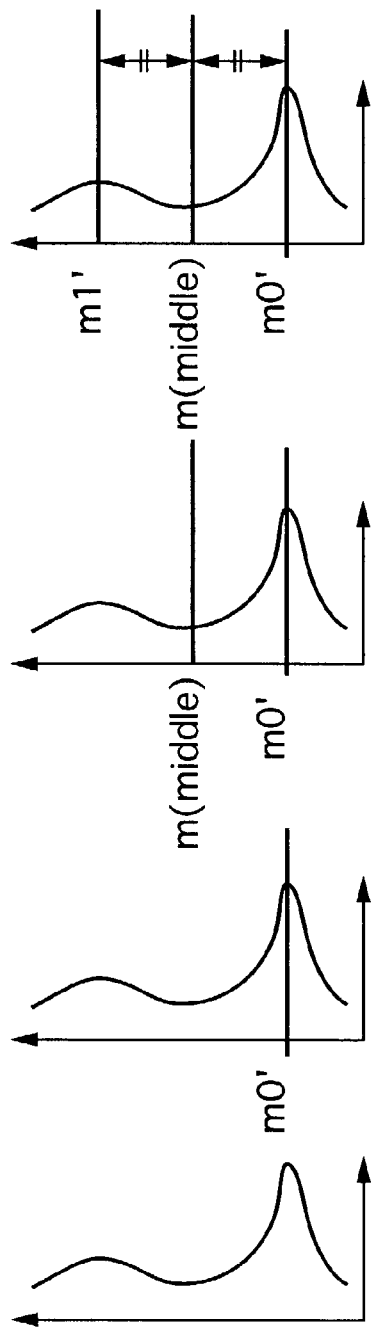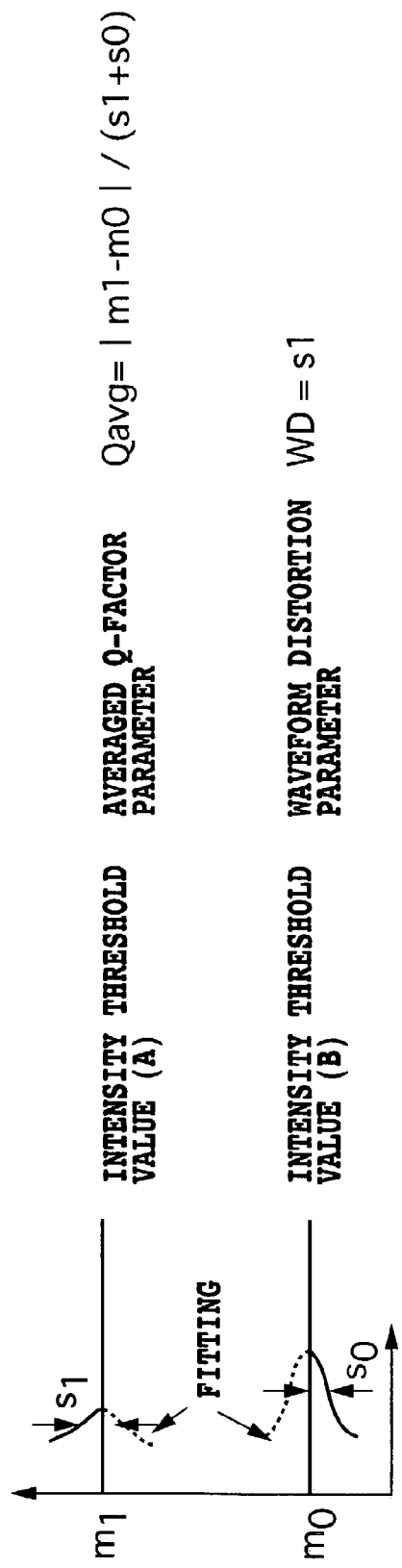

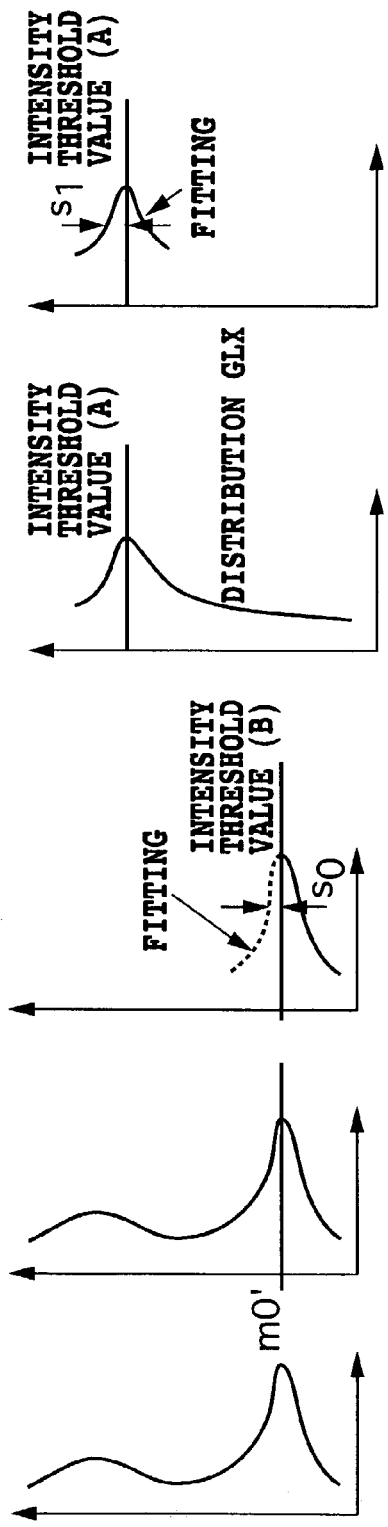
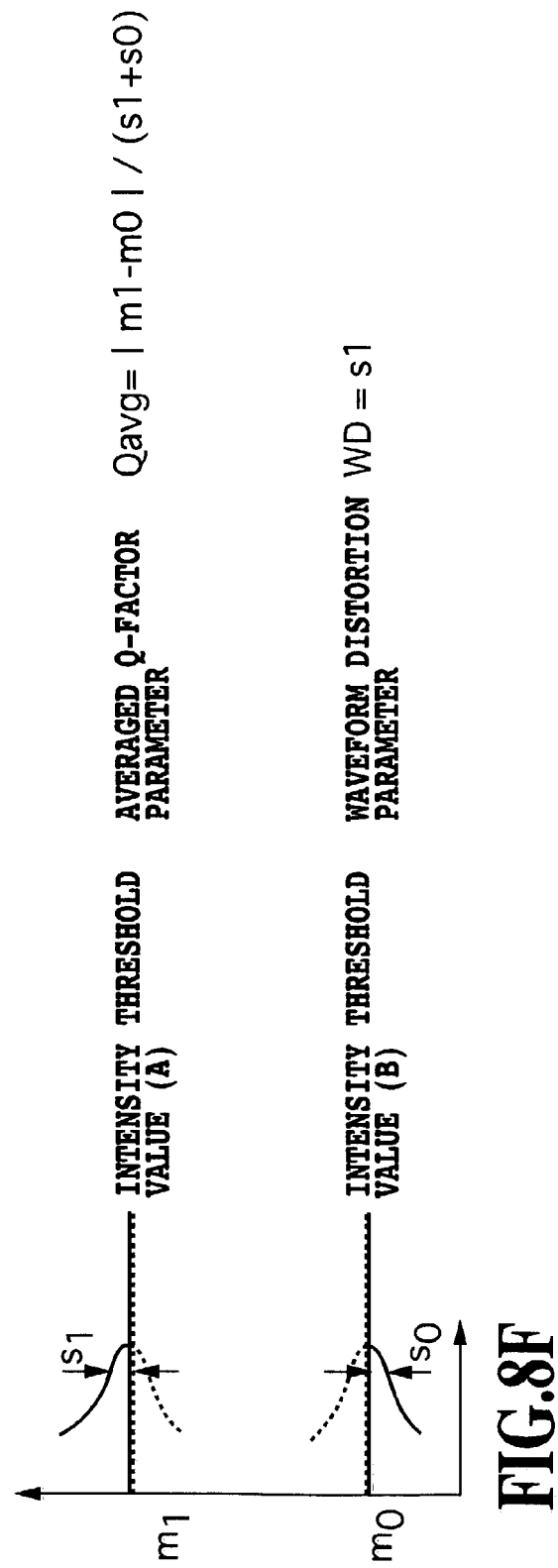

AVERAGED Q-FACTOR PARAMETER   $Q_{avg} = |m_1 - m_0| / (s_1 + s_0)$

WAVEFORM DISTORTION PARAMETER   $WD = s_1$

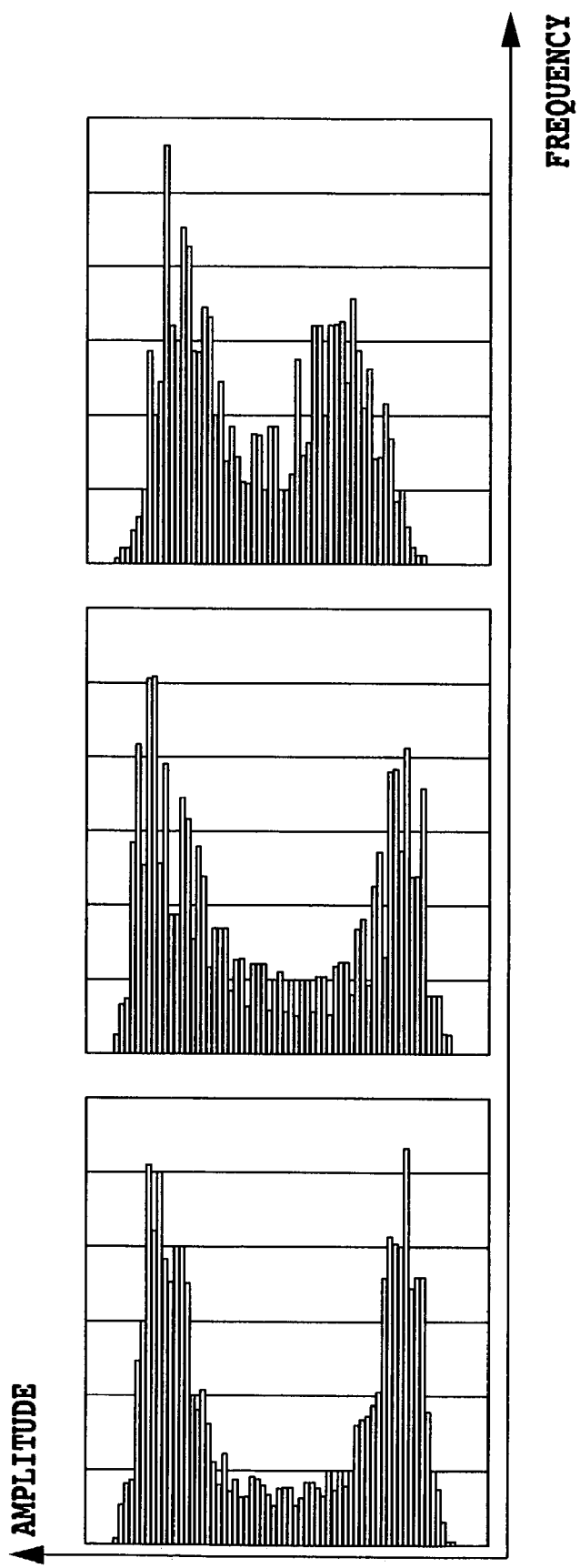

A SYSTEM FOR DETERMINING THE ORIGIN OF OPTICAL SIGNAL QUALITY DEGRADATION

METHOD AND SYSTEM FOR DETERMINING ORIGIN OF OPTICAL SIGNAL QUALITY DEGRADATION

This application is based on Japanese Patent Application No. 2001-214212 filed Jul. 13, 2001 in Japan, the content of which is incorporated hereinto by reference.

BACKGROUND OF THE INVENTION

1. Field of the Invention

The present invention relates to a method and system for determining the origin of optical signal quality degradation in optical communication.

2. Description of the Related Art

The point-to-point or point-to-multipoint communication in the optical communication up to the present time bundles signals by applying Optical Time Division Multiplexing (OTDM) to frames offered by a synchronous network.

Such OTDM employs a transmission system such as Synchronous Optical Network (SONET)/Synchronous Digital Hierarchy (SDH). The SONET/SDH transmission system defines overhead to perform efficient signal transmission (Reference [1]: ITU-T Recommendation G707), in which the overhead executes parity check called bit interleaved parity between repeaters and between line terminal multiplexer terminals to identify a fault section or to obtain a signal for switching and activating operations.

The signal quality monitoring system such as the SONET/SDH transmission system, however, requires a receiving system corresponding to a bit rate of the signals to be handled, signal format and modulation method (that is, NRZ (Non Return to Zero) or RZ (Return to Zero)). The receiving system comprises a clock extraction circuit, a receiving circuit, a frame detecting circuit and an error detection circuit such as a parity check circuit or collate circuit. Therefore, a single receiving system is not enough to handle a given bit rate, signal format or modulation method. In addition, it is necessary for the conventional optical signal monitoring system to carry out the electric signal processing after converting the optical signal into the electric signal. Accordingly, it is difficult to apply it to the optical amplifier repeater system considering the cost efficiency. For example, even if a network fault is detected, the section between the optical amplifier repeater systems, at which the fault occurs, cannot be identified.

In view of this, it is essential to construct an economical service transfer network that has a sufficient communication capability per service, and can handle a variety of signal formats and signal bit rates. The optical network is extremely promising because it can extend communication capability using OTDM or Wavelength Division Multiplexing (WDM), and has transparency for the signal bit rate, signal format and modulation method.

Thus, as an optical signal quality monitoring system suitable for such an optical network, a method of evaluating an optical signal quality parameter from an amplitude histogram is proposed (Reference [2]: EPC publication number EP0920150A2). FIG. 17 shows the conventional example. An optical signal quality monitoring section 1701 of the conventional example comprises an optical signal amplitude histogram measuring section 1703, an averaged Q-factor parameter evaluation section 1705 and an optical signal quality evaluation section 1707. The optical signal amplitude histogram measuring section 1703 obtains an optical signal amplitude histogram from a optical signal under measurement with a bit rate of $f_0$ (bit/s). The averaged Q-factor parameter evaluation section 1705 evaluates an averaged Q-factor parameter which is the optical signal quality parameter, from the optical signal amplitude histogram. The optical signal quality evaluation section 1707 analyzes the averaged Q-factor parameter to carry out the optical signal quality monitoring.

To meet a sharply growing demand for multimedia services today, it is necessary not only to increase the communication capability of individual services, but also to construct a network capable of efficiently handling a variety of signal bit rates and signal formats associated with video, audio, data and the like. In connection with this, the degradation factors of the optical signals to be monitored are diversified, such as the degradation in the optical signal-to-noise ratio because of the loss of a transmission optical fiber, loss within a transmission terminal and degradation in a light source, and the waveform distortion because of the chromatic dispersion in the transmission optical fiber. Thus, monitoring corresponding to individual degradation factors are especially needed.

However, although the averaged Q-factor parameter in the conventional example is sensitive to the degradation in the optical signal-to-noise ratio and the waveform distortion due to the chromatic dispersion, it cannot discriminate their causes.

SUMMARY OF THE INVENTION

The present invention is implemented to solve the foregoing problems. Therefore, an object of the present invention is to provide a method and system for determining the origin of optical signal quality degradation contributing to implementing a low cost, highly reliable optical network capable of accommodating multimedia services that have large communication capability per service, and a variety of signal formats and signal bit rates.

To accomplish the object, according to a first aspect of the present invention, there is provided a method for determining the origin of optical signal quality degradation including: an optical signal amplitude histogram measurement step of obtaining an optical signal amplitude histogram from a optical signal under measurement; and an averaged Q-factor parameter evaluation step of obtaining an averaged Q-factor parameter which is an optical signal quality parameter from the optical signal amplitude histogram obtained in the optical signal amplitude histogram measurement step, the method for determining the origin of optical signal quality degradation further comprising: a waveform distortion parameter evaluation step of obtaining a waveform distortion parameter which is an optical signal quality parameter from the optical signal amplitude histogram obtained in the optical signal amplitude histogram measurement step; and an optical signal quality evaluation step of evaluating an optical signal quality degradation factor using a measurement value of the averaged Q-factor parameter and a measurement value of the waveform distortion parameter obtained in the averaged Q-factor parameter evaluation step and the waveform distortion parameter evaluation step, wherein the optical signal quality evaluation step makes a decision as to whether a main factor of the optical signal quality degradation is the waveform distortion in the optical signal under measurement or not by determining and evaluating both the averaged Q-factor parameter and the waveform distortion parameter.

According to a second aspect of the present invention, there is provided a method for determining the origin of optical signal quality degradation comprising, in addition to the optical signal amplitude histogram measurement step, the averaged Q-factor parameter evaluation step, and the waveform distortion parameter evaluation step, an initial state storing step of storing into a storing medium at least one of an initial value and initial characteristic of the averaged Q-factor parameter and that of the waveform distortion parameter at a system installation without optical signal quality degradation, which are obtained using the averaged Q-factor parameter evaluation step and the waveform distortion parameter evaluation step; and an optical signal quality evaluation step of evaluating an optical signal quality degradation factor using a measurement value of the averaged Q-factor parameter and a measurement value of the waveform distortion parameter obtained in the averaged Q-factor parameter evaluation step and the waveform distortion parameter evaluation step, and using at least one of the initial values and initial characteristics stored in the storing medium in the initial state storing step, wherein the optical signal quality evaluation step makes a decision as to whether a main factor of the optical signal quality degradation is the waveform distortion in the optical signal under measurement or not by determining and evaluating both the averaged Q-factor parameter and the waveform distortion parameter.

According to a third aspect of the present invention, there is provided a method for determining the origin of optical signal quality degradation comprising: an optically splitting step of splitting a optical signal under measurement; an optical signal amplitude histogram measurement step of obtaining an optical signal amplitude histogram from a first optical signal under measurement which is obtained by splitting the optical signal under measurement in the optically splitting step; and an averaged Q-factor parameter evaluation step of obtaining an averaged Q-factor parameter which is an optical signal quality parameter from the optical signal amplitude histogram obtained in the optical signal amplitude histogram measurement step, wherein the method for determining the origin of optical signal quality degradation further comprises: an optical signal to optical noise power measurement step of measuring optical signal to optical noise power from a second optical signal under measurement which is obtained by splitting the optical signal under measurement in the optically splitting step; an optical signal-to-noise ratio parameter evaluation step of obtaining an optical signal-to-noise ratio parameter which is an optical signal quality parameter from the optical signal to optical noise power obtained in the optical signal to optical noise power measurement step; and an optical signal quality evaluation step of evaluating an optical signal quality degradation factor using a measurement value of the averaged Q-factor parameter obtained in the averaged Q-factor parameter evaluation step and a measurement value of the optical signal-to-noise ratio parameter obtained in the optical signal-to-noise ratio parameter evaluation step, wherein the optical signal quality evaluation step makes a decision as to whether a main factor of the optical signal quality degradation is the degradation in the optical signal-to-noise ratio or not by determining and evaluating both the averaged Q-factor parameter and the optical signal-to-noise ratio parameter.

According to a fourth aspect of the present invention, there is provided a method for determining the origin of optical signal quality degradation comprising, in addition to the optically splitting step, the optical signal amplitude histogram measurement step, the averaged Q-factor parameter evaluation step, the optical signal to optical noise power measurement step, and the optical signal-to-noise ratio parameter evaluation step, an initial state storing step of storing into a storing medium at least one of an initial value and initial characteristic of the averaged Q-factor parameter and that of the optical signal-to-noise ratio parameter at a system installation without optical signal quality degradation, which are obtained using the averaged Q-factor parameter evaluation step and the optical signal-to-noise ratio parameter evaluation step; and an optical signal quality evaluation step of evaluating an optical signal quality degradation factor using a measurement value of the averaged Q-factor parameter obtained in the averaged Q-factor parameter evaluation step and a measurement value of the optical signal-to-noise ratio parameter obtained in the optical signal-to-noise ratio parameter evaluation step, and using at least one of the initial values and initial characteristics of the averaged Q-factor parameter and that of the optical signal-to-noise ratio parameter at the system installation without optical signal quality degradation, which are stored in the storing medium in the initial state storing step, wherein the optical signal quality evaluation step makes a decision as to whether a main factor of the optical signal quality degradation is the degradation in the optical signal-to-noise ratio or not by determining and evaluating both the averaged Q-factor parameter and the optical signal-to-noise ratio parameter.

According to a fifth aspect of the present invention, there is provided a method for determining the origin of optical signal quality degradation comprising, in addition to the optically splitting step, and the optical signal amplitude histogram measurement step, an optical signal to optical noise power measurement step of measuring optical signal to optical noise power from a second optical signal under measurement which is obtained by splitting the optical signal under measurement in the optically splitting step; a waveform distortion parameter evaluation step of obtaining a waveform distortion parameter which is an optical signal quality parameter from the optical signal amplitude histogram obtained in the optical signal amplitude histogram measurement step; an optical signal-to-noise ratio parameter evaluation step of obtaining an optical signal-to-noise ratio parameter which is an optical signal quality parameter from the optical signal to optical noise power obtained in the optical signal to optical noise power measurement step; and an optical signal quality evaluation step of evaluating an optical signal quality degradation factor using a measurement value of the waveform distortion parameter obtained in the waveform distortion parameter evaluation step and a measurement value of the optical signal-to-noise ratio parameter obtained in the optical signal-to-noise ratio parameter evaluation step, wherein the optical signal quality evaluation step makes a decision as to whether a main factor of the optical signal quality degradation is the degradation in the optical signal-to-noise ratio or the waveform distortion by determining and evaluating both the waveform distortion parameter and the optical signal-to-noise ratio parameter.

According to a sixth aspect of the present invention, there is provided a method for determining the origin of optical signal quality degradation comprising, besides the optically splitting step, the optical signal amplitude histogram measurement step, the optical signal to optical noise power measurement step, and the waveform distortion parameter evaluation step, an optical signal-to-noise ratio parameter evaluation step of obtaining an optical signal-to-noise ratio parameter which is an optical signal quality parameter from the optical signal to optical noise power obtained in the optical signal to optical noise power measurement step; an initial state storing step of storing into a storing medium at least one of an initial value and initial characteristic of the waveform distortion parameter and that of the optical signal-to-noise ratio parameter at a system installation without optical signal quality degradation, which are obtained using the waveform distortion parameter evaluation step and the optical signal-to-noise ratio parameter evaluation step; and an optical signal quality evaluation step of evaluating an optical signal quality degradation factor using a measurement value of the waveform distortion parameter obtained in the waveform distortion parameter evaluation step and a measurement value of the optical signal-to-noise ratio parameter obtained in the optical signal-to-noise ratio parameter evaluation step, and using at least one of the initial values and initial characteristics of the waveform distortion parameter and that of the optical signal-to-noise ratio parameter at the system installation without optical signal quality degradation, wherein the optical signal quality evaluation step makes a decision as to whether a main factor of the optical signal quality degradation is the degradation in the optical signal-to-noise ratio or the waveform distortion by determining and evaluating both the waveform distortion parameter and the optical signal-to-noise ratio parameter.

According to a seventh aspect of the present invention, there is provided a method for determining the origin of optical signal quality degradation comprising, besides the optically splitting step, the optical signal amplitude histogram measurement step, the averaged Q-factor parameter evaluation step, the optical signal to optical noise power measurement step, the waveform distortion parameter evaluation step, and the optical signal-to-noise ratio parameter evaluation step, an optical signal quality evaluation step of evaluating an optical signal quality degradation factor using a measurement value of the averaged Q-factor parameter obtained in the averaged Q-factor parameter evaluation step, a measurement value of the waveform distortion parameter obtained in the waveform distortion parameter evaluation step, and a measurement value of the optical signal-to-noise ratio parameter obtained in the optical signal-to-noise ratio parameter evaluation step, wherein the optical signal quality evaluation step makes a decision as to whether a main factor of the optical signal quality degradation is the degradation in the optical signal-to-noise ratio, the waveform distortion or not by determining and evaluating all the averaged Q-factor parameter, the waveform distortion parameter and the optical signal-to-noise ratio parameter.

According to an eighth aspect of the present invention, there is provided a method for determining the origin of optical signal quality degradation comprising, besides the optically splitting step, the optical signal amplitude histogram measurement step, the averaged Q-factor parameter evaluation step, the optical signal to optical noise power measurement step, the waveform distortion parameter evaluation step, and the optical signal-to-noise ratio parameter evaluation step, an initial state storing step of storing into a storing medium at least one of an initial value and initial characteristic of the averaged Q-factor parameter, that of the waveform distortion parameter and that of the optical signal-to-noise ratio parameter at a system installation without optical signal quality degradation, which are obtained using the averaged Q-factor parameter evaluation step, the waveform distortion parameter evaluation step and the optical signal-to-noise ratio parameter evaluation step; and an optical signal quality evaluation step of evaluating an optical signal quality degradation factor using a measurement value of the averaged Q-factor parameter obtained in the averaged Q-factor parameter evaluation step, a measurement value of the waveform distortion parameter obtained in the waveform distortion parameter evaluation step, and a measurement value of the optical signal-to-noise ratio parameter obtained in the optical signal-to-noise ratio parameter evaluation step, and using at least one of the initial values and initial characteristics of the averaged Q-f actor parameter, that of the waveform distortion parameter and that of the optical signal-to-noise ratio parameter at the system installation without optical signal quality degradation, which are stored in the storing means by the initial state storing step, wherein the optical signal quality evaluation step makes a decision as to whether a main factor of the optical signal quality degradation is the degradation in the optical signal-to-noise ratio, the waveform distortion or not by determining and evaluating all the averaged Q-factor parameter, the waveform distortion parameter and the optical signal-to-noise ratio parameter.

Here, the optical signal amplitude histogram measurement step may comprise: an opto-electric conversion step of converting the optical signal under measurement with a bit rate of $f_0$ (bit/s) into an electric intensity modulated signal; an electrically sampling step of sampling the electric intensity modulated signal obtained in the opto-electric conversion step by a sampling clock with a repetition frequency of $f_1$ (Hz)=(n/m)$f_0$+a, where n and m are a natural number, and a is an offset frequency; and a histogram evaluation step of obtaining an optical signal intensity distribution from the sampled signal obtained in the electrically sampling step, and of obtaining the optical signal amplitude histogram from the optical signal intensity distribution within an averaging time period.

The optical signal amplitude histogram measurement step may comprise: an optical combining step of combining the optical signal under measurement of a bit rate $f_0$ (bit/s) with a sampling optical pulse train whose repetition frequency is $f_1$ (Hz)=(n/m)$f_0$+a, where n and m are a natural number, and a is an offset frequency, and whose pulse width is substantially narrower than a time slot with a bit rate of $f_0$ (bit/s); a cross-correlation optical signal generating step of obtaining a cross-correlation optical signal by launching the combined light which is combined in the optical combining step into a nonlinear optical medium for inducing nonlinear interaction between the optical signal under measurement and the sampling optical pulse train; an optically splitting step of splitting the cross-correlation optical signal obtained in the cross-correlation optical signal generating step from the optical signal under measurement and the sampling optical pulse train; an opto-electric conversion step of converting the cross-correlation optical signal, which is obtained by the splitting in the optically splitting step, into an electric intensity modulated signal; and a histogram evaluation step of obtaining an optical signal intensity distribution from the electric intensity modulated signal obtained in the opto-electric conversion step, and of obtaining the optical signal amplitude histogram from the optical signal intensity distribution within the averaging time period.

The optical signal amplitude histogram measurement step may comprise: an optically gating step of sampling the optical signal under measurement with a bit rate of $f_0$ (bit/s) by a sampling clock the sampling clock generating step generates, the sampling clock having a repetition frequency of $f_1$ (Hz)=(n/m)$f_0$+a, where n and m are a natural number, and a is an offset frequency; an opto-electric conversion step of converting the sampled optical signal obtained in the optically gating step into a sampled electric signal; and a histogram evaluation step of obtaining an optical signal intensity distribution from the sampled electric signal obtained in the opto-electric conversion step, and of obtaining the optical signal amplitude histogram from the optical signal intensity distribution within an averaging time period.

The averaged Q-factor parameter evaluation step and the waveform distortion parameter evaluation step may comprise the steps of: estimating an amplitude histogram distribution function g1 associated with "level 1" from a portion of the amplitude histogram greater than a predetermined intensity threshold value (a); estimating an amplitude histogram distribution function g0 associated with "level 0" from a portion of the amplitude histogram less than another predetermined intensity threshold value (b); obtaining mean intensity values and standard deviations of "level 1" and "level 0" from the functions g1 and g0; calculating the averaged Q-factor parameter as a ratio of a difference between the mean intensity values of the "level 1" and "level 0" to the sum of the standard deviations of the "level 1" and "level 0"; and adopting at least one of the standard deviation of the "level 1", the standard deviation of the "level 0", and the difference between the mean intensity values of the "level 1" and "level 0" as the waveform distortion parameter.

The present invention includes a system for determining the origin of optical signal quality degradation, in which the steps of the method in accordance with the present invention are replaced by the corresponding means.

The foregoing configuration can monitor the degradation factor of the optical signal quality. Thus, it can implement a low cost, highly reliable optical network capable of accommodating multimedia services that have large communication capability per service, and a variety of signal formats and signal bit rates.

The above and other objects, effects, features and advantages of the present invention will become more apparent from the following description of embodiments thereof taken in conjunction with the accompanying drawings.

BRIEF DESCRIPTION OF THE DRAWINGS

FIGS. 6A–6E are characteristic diagrams showing a first example of the evaluation algorithm of the averaged Q-factor parameter and waveform distortion parameter in the system for determining the origin of optical signal quality degradation as shown in FIGS. 1A and 1B;

FIGS. 7A–7E are characteristic diagrams showing a second example of the evaluation algorithm of the averaged Q-factor parameter and waveform distortion parameter in the system for determining the origin of optical signal quality degradation as shown in FIGS. 1A and 1B;

FIGS. 8A–8F are characteristic diagrams showing a third example of the evaluation algorithm of the averaged Q-factor parameter and waveform distortion parameter in the system for determining the origin of optical signal quality degradation as shown in FIGS. 1A and 1B;

FIGS. 10A–11C are graphs illustrating optical signal amplitude histograms obtained from a 10 Gbit/s NRZ optical signal in the system for determining the origin of optical signal quality degradation as shown in FIGS. 1A and 1B;

DETAILED DESCRIPTION OF PREFERRED EMBODIMENTS

The configurations and operations of the embodiments in accordance with the present invention will now be described with reference to the accompanying drawings.

(First Embodiment)

Figure 1A:
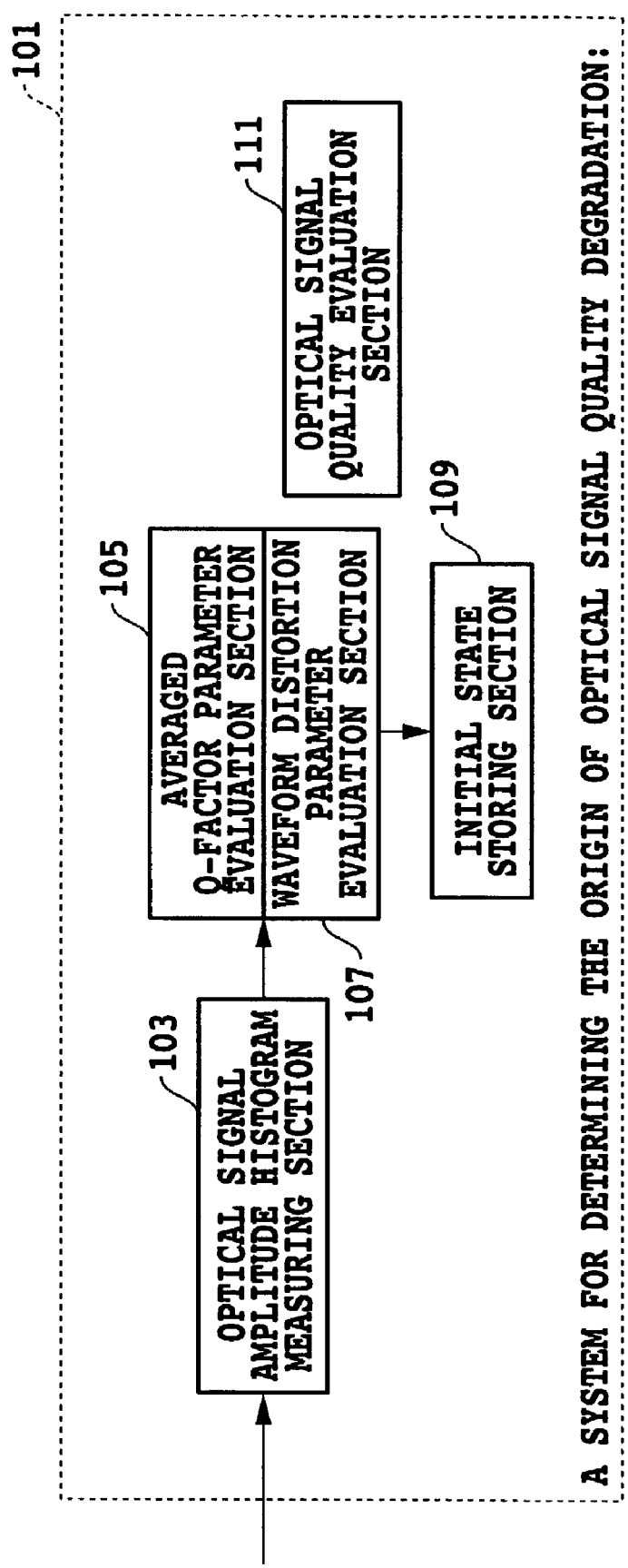
FIGS. 1A and 1B are block diagrams each showing a configuration of a system for determining the origin of optical signal quality degradation of a first embodiment in accordance with the present invention.
Figure 1B:
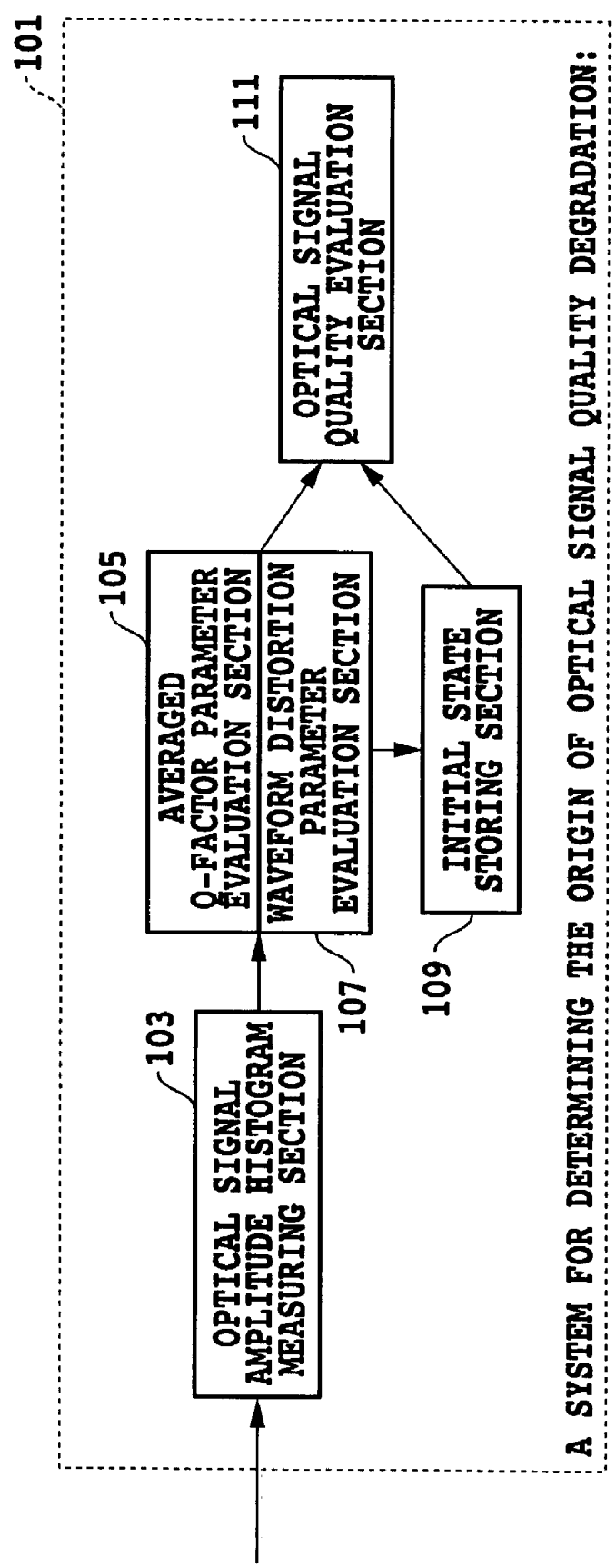

FIGS. 1A and 1B show a system for determining the origin of optical signal quality degradation of a first embodiment in accordance with the present invention. The system for determining the origin of optical signal quality degradation 101 of the present embodiment comprises an optical signal amplitude histogram measuring section 103, an averaged Q-factor parameter evaluation section 105, a waveform distortion parameter evaluation section 107, an initial state storing section 109 and an optical signal quality evaluation section 111.

The optical signal amplitude histogram measuring section 103 obtains an optical amplitude histogram from the optical signal under measurement. The averaged Q-factor parameter evaluation section 105 obtains the averaged Q-factor parameter which is the optical signal quality parameter, from the optical signal amplitude histogram. The waveform distortion parameter evaluation section 107 obtains the waveform distortion parameter which is the optical signal quality parameter, from the optical signal amplitude histogram. The initial state storing section 109 stores into the storing medium the initial values or initial characteristics of the averaged Q-factor parameter and waveform distortion parameter at the system installation without the optical signal quality degradation.

The optical signal quality evaluation section 111 evaluates an optical signal quality degradation factor using the measurement value of the averaged Q-factor parameter and the measurement value of the waveform distortion parameter, and the initial values or initial characteristics stored in the storing medium of the initial state storing section 109. In this case, the evaluation section 111 decides as to whether the main factor of the optical signal quality degradation is the waveform distortion in the optical signal under measurement or not by determining and evaluating both the averaged Q-factor parameter and waveform distortion parameter.

Figure 2:
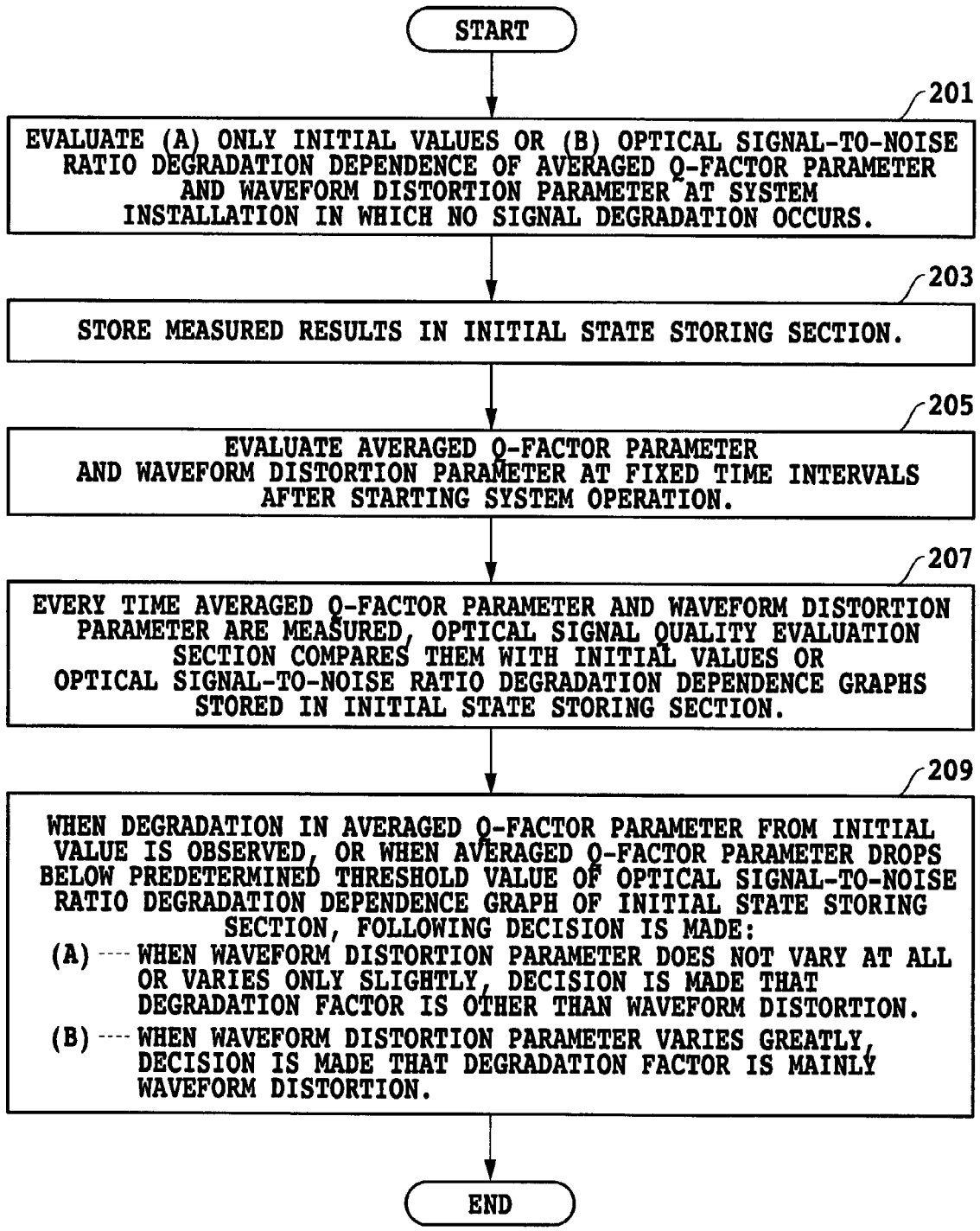
FIG. 2 is a flowchart illustrating an estimation algorithm of the optical signal degradation factors used by the system for determining the origin of optical signal quality degradation of the first embodiment in accordance with the present invention.

Next, the procedure of monitoring the optical signal quality degradation factor in the present embodiment will be described in detail with reference to FIG. 2.

Step 201: Evaluate (a) only the initial value, or (b) the optical signal-to-noise ratio degradation dependence of the averaged Q-factor parameter and waveform distortion parameter at the system installation without the signal degradation.

Step 203: Store measurement results obtained at Step 201 into the initial state storing section 109 (see, FIG. 1A up to this step).

Step 205: Evaluate the averaged Q-factor parameter and waveform distortion parameter at fixed time intervals after the start of the system operation.

Step 207: Every time the averaged Q-factor parameter and waveform distortion parameter are measured, the optical signal quality evaluation section 111 compares the measurement values with the initial values or the optical signal-to-noise ratio degradation dependence graph in the initial state storing section 109.

Step 209: When the degradation in the averaged Q-factor parameter from the initial value is observed, or when the averaged Q-factor parameter drops below a predetermined threshold value of the optical signal-to-noise ratio degradation dependence graph in the initial state storing section, the following decision is made:

(a) When the waveform distortion parameter does not vary at all or varies only slightly, a decision is made that the degradation factor is other than the waveform distortion.

(b) When the waveform distortion parameter varies greatly, a decision is made that the degradation factor is mainly the waveform distortion (see, FIG. 1B up to this step).

Figure 3:
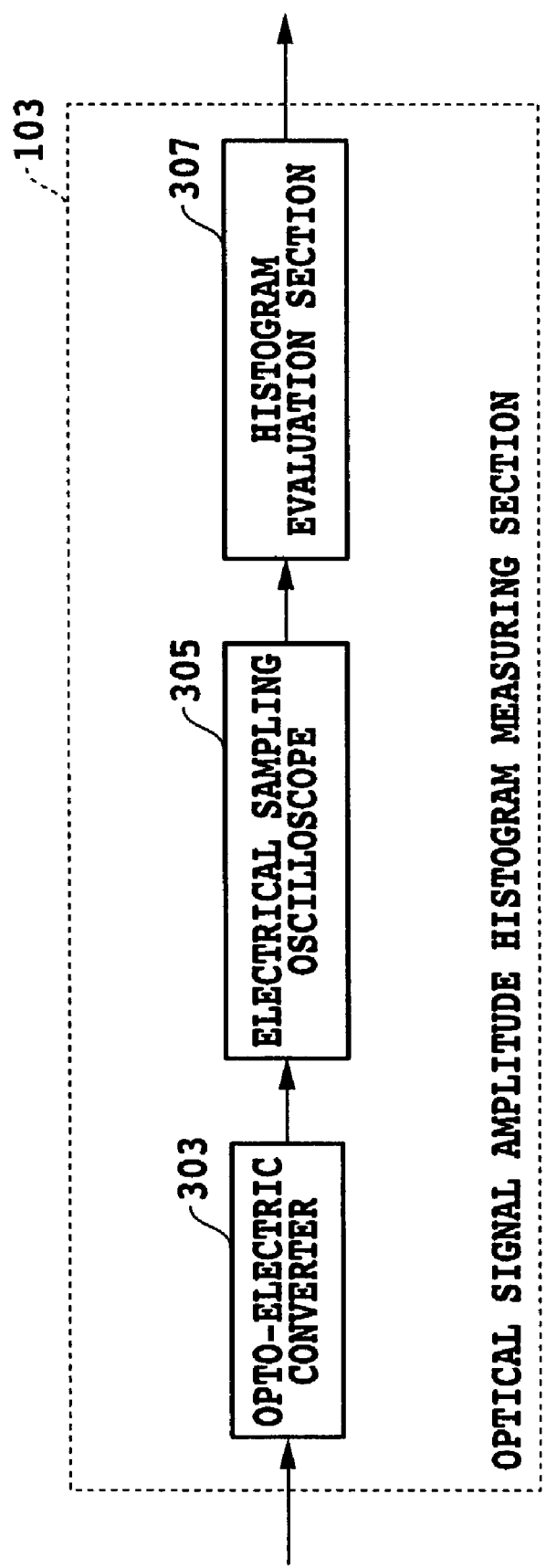
FIG. 3 is a block diagram showing a configuration of the optical signal amplitude histogram measuring section of FIGS. 1A and 1B.
Figures 5A, 5B:
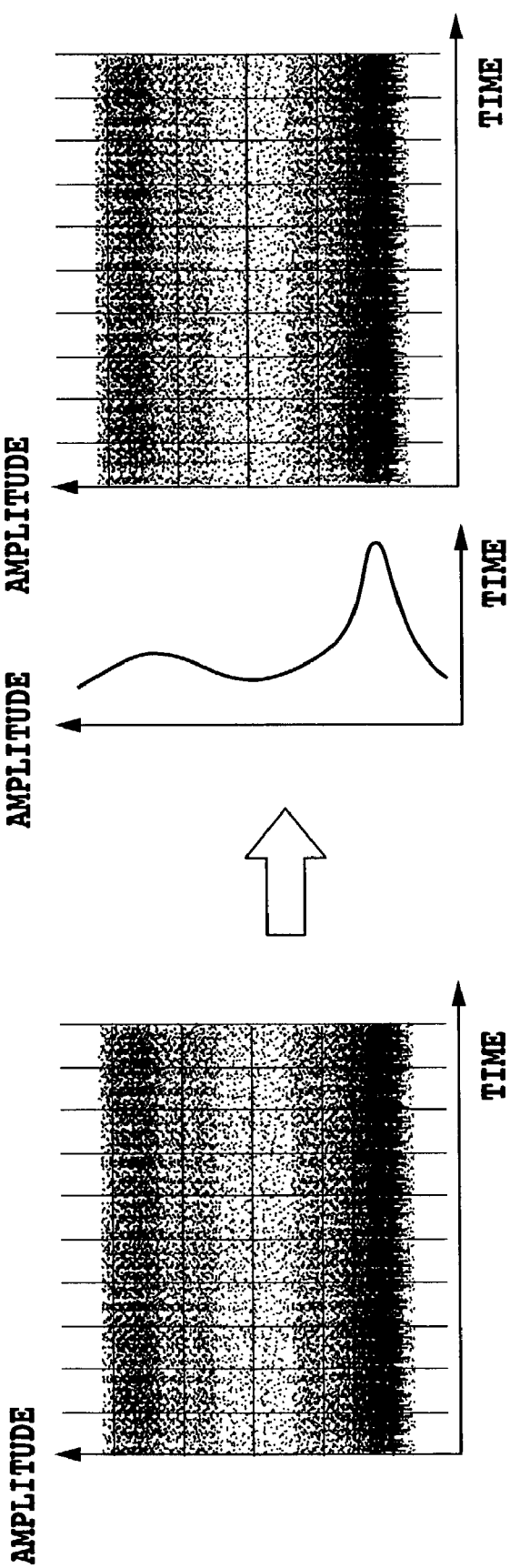
FIGS. 5A and 5B are characteristic diagrams showing a histogram evaluation method in the system for determining the origin of optical signal quality degradation as shown in FIGS. 1A and 1B.

The optical signal amplitude histogram measuring section 103 is composed of an opto-electric converter 303, an electrical sampling oscilloscope 305 and a histogram evaluation section 307 as shown in FIG. 3, for example. In the configuration, the opto-electric converter 303 converts the optical signal under measurement with a bit rate of $f_0$ (bit/s) into an electric intensity modulated signal; the electrical sampling oscilloscope 305 samples the electric intensity modulated signal using the sampling clock with a repetition frequency of $f_1$ (Hz) ($f_1=(n/m)f_0+a$, where n and m are a natural number and a is an offset frequency); and the histogram evaluation section 307 obtains the optical signal intensity distribution from the sampled signal obtained by the sampling oscilloscope 305 as illustrated in FIGS. 5A and 5B, and obtains the optical signal amplitude histogram from the optical signal intensity distribution within a certain averaging time period.

Figure 4:
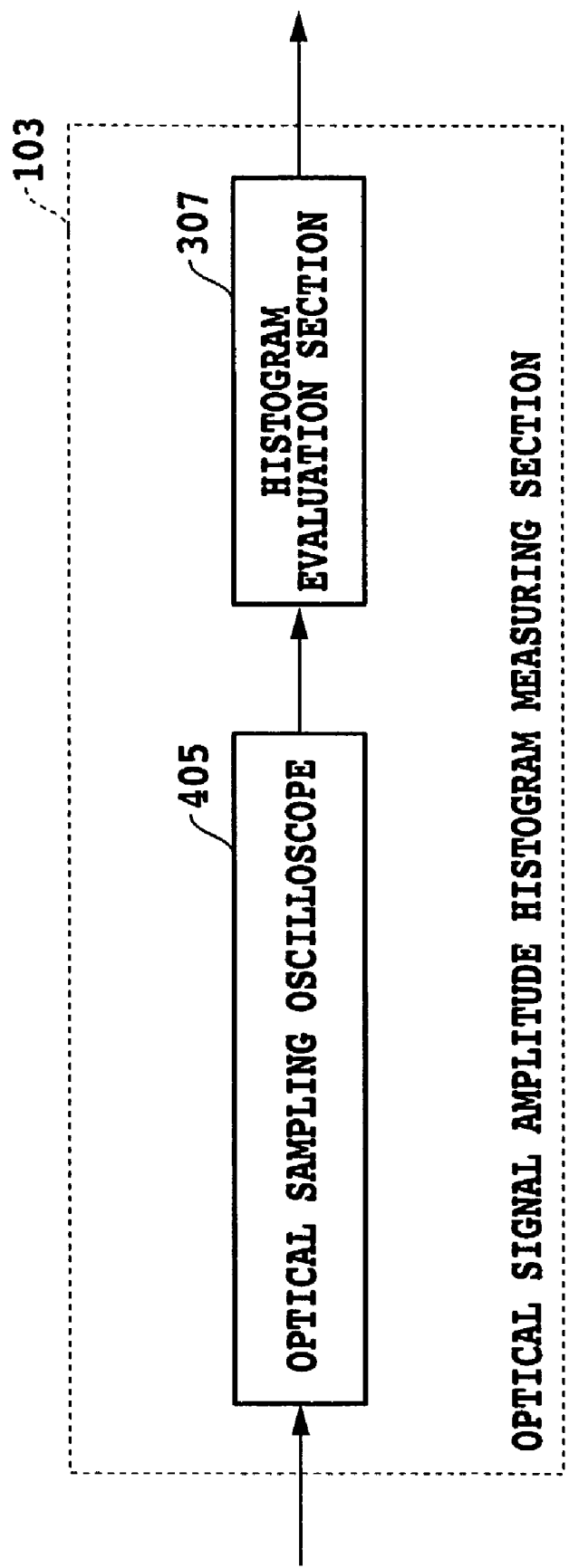
FIG. 4 is a block diagram showing another configuration of the optical signal amplitude histogram measuring section of FIGS. 1A and 1B.

FIG. 4 shows another example of the optical signal amplitude histogram measuring section 103. The optical signal amplitude histogram measuring section 103 comprises an optical sampling oscilloscope 405 and a histogram evaluation section 307.

The optical sampling oscilloscope 405 can utilize a known optical sampling method (Reference [3]: H. Takara, S. Kawanishi, A. Yokoo, S. Tomaru, T. Kitoh, and M. Saruwatari, "100 Gbit/s optical signal eye-diagram measurement with optical sampling using organic nonlinear optical crystal", Electron, Lett., 24, pp. 2256–2258, 1996). More specifically, the optical sampling oscilloscope 405 comprises an optical combining section for combining the optical signal under measurement whose bit rate is $f_0$ (bit/s) with a sampling optical pulse train whose repetition frequency is $f_1$ (Hz) ($f_1=(n/m)f_0+a$, where n and m are a natural number, and a is an offset frequency) and whose pulse width is sufficiently narrower than the time slot with a bit rate $f_0$ (bit/s); a cross-correlation optical signal generating section for obtaining the cross-correlation optical signal by launching the optical signal under measurement and the sampling optical pulse train into a nonlinear optical medium for bringing about the nonlinear interaction between them; an optical splitting section for splitting the cross-correlation optical signal from the optical signal under measurement and the sampling optical pulse train; an opto-electric converter for converting the cross-correlation optical signal split by the optical splitting section into the electric intensity modulated signal; and a histogram evaluation section for calculating the optical signal intensity distribution from the electric intensity modulated signal as shown in FIGS. 5A and 5B, and for obtaining an optical signal amplitude histogram from the optical signal intensity distribution within the averaging time period.

Alternatively, the optical sampling oscilloscope 405 can comprise a sampling clock generating section; an optical gating section for sampling the optical signal whose bit rate is $f_0$ (bit/s) using a sampling clock which is generated by the sampling clock generating section and whose repetition frequency is $f_1$ (Hz) ($f_0=(n/m)f_0+a$, where n and m are a natural number and a is an offset frequency); an opto-electric converter for receiving the sampled optical signal from the optical gating section and for converting it into a sampled electric signal; and a histogram evaluation section for calculating the optical signal intensity distribution from the sampled electric signal, and for obtaining the optical signal amplitude histogram from the optical signal intensity distribution within a certain averaging time period. Here, the sampling clock generating section can utilize electric short pulse generation by a synthesized signal generator plus comb generator. In addition, it can use an electric amplifier before or after the comb generator as needed, or a baseband clipper after the comb generator as needed. The optical gating section can employ the gating operation by an electro-absorption optical modulator.

The averaged Q-factor parameter evaluation section 105 and the waveform distortion parameter evaluation section 107 as shown in FIGS. 1A and 1B can utilize the evaluation method as illustrated in FIGS. 6A–9C.

The evaluation algorithm of the averaged Q-factor parameter and waveform distortion parameter as illustrated in FIGS. 6A–6E is as follows.

(1) For the optical signal amplitude histogram (FIG. 6A) obtained by the optical signal amplitude histogram measuring section 103,
(2) determine a local maximum m0' by searching from the least intensity level of the amplitude histogram (FIG. 6B).
(3) Subsequently, integrate the number of sampling points from the sampling point (m0') with the maximum intensity level toward the smaller intensity level, and calculate the number of sampling points N(middle) as follows:

$$N(\text{middle}) = N(\text{total}) \times D \times M$$

where N(total) is the total number of sampling points, D is the duty ratio of the optical signal (the ratio between the pulse width and time slot), and M is a mark rate (occurrence probability of level 1 in the digital transmission). Then, the minimum level m(middle) of the sampling point at which the integral value becomes equal to the number of sampling points N(middle) (FIG. 6C).
(4) Determine m1' given by $$m1' = 2 \times \{m(\text{middle}) - m0'\}$$

as shown in FIG. 6D.
(5) Determine a threshold value (a) as the intensity level given by $$m1' - \text{alpha}(m1' - m0')$$

and a threshold value (b) as the intensity level given by $$m0' + \text{alpha}(m1' - m0')$$

where alpha is a real number satisfying 0<alpha<0.5.

Subsequently, calculate mean values m1 and m0 and standard deviations s1 and s0 in the distributions g1 and g0 (FIG. 6), where g1 denotes a distribution of the level 1 in which the intensity level is equal to or greater than the threshold value (a), and g0 denotes a distribution of the level 0 in which the intensity level is equal to or less than the threshold value (b).
(6) Calculate the following Q value as the averaged Q-factor parameter from the mean values and standard deviations obtained in (5).

$$Q\text{avg} = |m1 - m0|/(s1 + s0)$$

Then, adopt s1 as a waveform distortion parameter (WD).

The evaluation algorithm of the averaged Q-factor parameter and waveform distortion parameter as illustrated in FIGS. 7A–7E is as follows.
(1) For the optical signal amplitude histogram (FIG. 7A) obtained by the optical signal amplitude histogram measuring section 103,
(2) determine a first local maximum (m0')which is obtained by searching from the least intensity level of the amplitude histogram as the threshold value (b) (FIG. 7B).
(3) Subsequently, integrate the number of sampling points from the sampling point (m0') with the maximum intensity level toward the smaller intensity level, and calculate the number of sampling points N(middle) as follows:

$$N(\text{middle}) = N(\text{total}) \times D \times M$$

where N(total) is the total number of sampling points, D is the duty ratio of the optical signal (the ratio between the pulse width and time slot), and M is a mark rate (occurrence probability of level 1 in the digital transmission). Then, the minimum level m(middle) of the sampling point at which the integral value becomes equal to the number of sampling points N(middle) (FIG. 7C).

(4) Determine the threshold value (a) given by $$\text{threshold value } (a) = 2 \times \{m(\text{middle}) - \text{threshold value } (b)\}$$

as shown the sampling point (m1') in FIG. 7D.
(5) On the assumption that in the amplitude histogram, the portion whose intensity level is equal to or greater than the threshold value (a) constitutes a part of a normal distribution g1, and the portion whose intensity level is equal to or less than the threshold value (b) constitutes a part of a normal distribution go, calculate the mean values m1 and m0 and standard deviations s1 and s0 of the levels 1 and 0 by fitting the least squares method or the like (FIG. 7E).
(6) Calculate the following Q factor as the averaged Q-factor parameter from the mean values and standard deviations obtained in (5).

$$Q\text{avg} = |m1 - m0|/(s1 + s0)$$

Then, adopt s1 as a waveform distortion parameter. As the distribution functions g0 and g1, a chi-square distribution is also applicable (Reference [4]: D. Marcuse, "Derivation of Analytical Expressions for the Bit-Error Probability in Lightwave Systems with Optical Amplifiers", IEEE J. Lightwave Technol., Vol. 8, No. 12, pp 1816–1823, 1990).

The evaluation algorithm of the averaged Q-factor parameter and waveform distortion parameter as illustrated in FIGS. 8A–8F is as follows.
(1) For the optical signal amplitude histogram (FIG. 8A) obtained by the optical signal amplitude histogram measuring section 103,
(2) determine a first local maximum which is obtained by searching from the least intensity level of the amplitude histogram as the threshold value (b) (FIG. 8B).
(3) On the assumption that in the amplitude histogram, the portion whose intensity level is equal to or less than the threshold value (b) constitutes a part of a normal distribution g0, calculate the mean value m0 and standard deviation s0 of the level 0 by fitting the least squares method or the like (FIG. 8C).
(4) Calculate a distribution g1x by subtracting the function g0 obtained in (3) from the entire amplitude histogram. Then, determine the first local maximum, which is obtained by searching the distribution g1x beginning from the greatest intensity level, as the threshold value (a). The distribution g1x is considered to be a superposition of a distribution function gx at the cross point and a distribution function g1 of the level 1 (FIG. 8D).
(5) On the assumption that in the distribution g1x, the portion whose intensity level is equal to or greater than the threshold value (a) constitutes a part of the normal distribution g1, calculate the mean value m1 and standard deviation s1 of the level 1 by fitting the least squares method or the like (FIG. 8E).
(6) Adopt the threshold values (a) and (b) as the values m1 and m0 (FIG. 8F).
(7) Calculate the following Q factor as the averaged Q-factor parameter from the mean values and standard deviations obtained in (3) and (5).

$$Q\text{avg} = |m1 - m0|/(s1 + s0)$$

Then, adopt s1 as a waveform distortion parameter. As the distribution functions g0 and g1, a chi-square distribution is also applicable (Reference [4]).

Figures 9A, 9B:
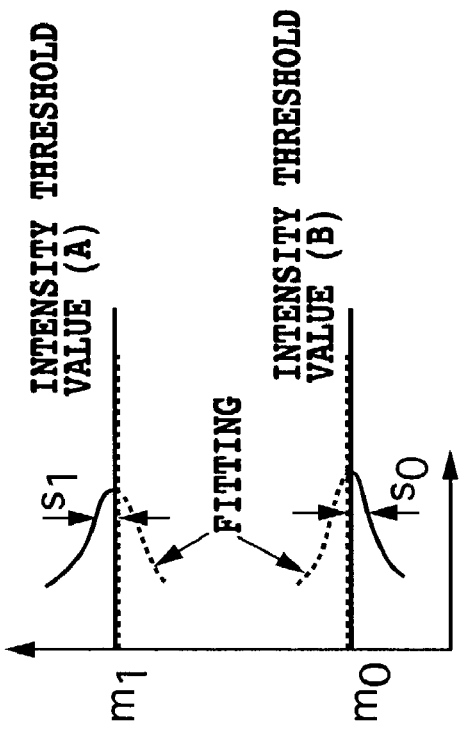
FIGS. 9A–9C are characteristic diagrams showing a fourth example of the evaluation algorithm of the averaged Q-factor parameter and waveform distortion parameter in the system for determining the origin of optical signal quality degradation as shown in FIGS. 1A and 1B.
Figure 9C:
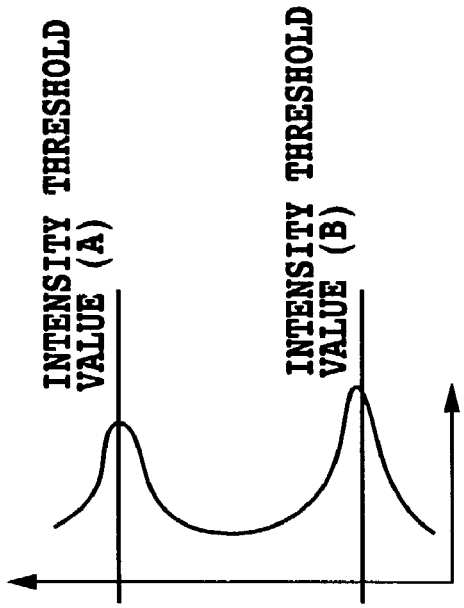

The evaluation algorithm of the averaged Q-factor parameter and waveform distortion parameter as illustrated in FIGS. 9A–9C is as follows.

(1) For the optical signal amplitude histogram (FIG. 9A) obtained by the optical signal amplitude histogram measuring section 103, (2) determine a first local maximum which is obtained by searching from the greatest intensity level of the amplitude histogram as the threshold value (a), and a first local maximum which is obtained by searching from the least intensity level of the amplitude histogram as the threshold value (b) (FIG. 9B).

(3) On the assumption that in the amplitude histogram, the portion whose intensity level is equal to or greater than the threshold value (a) constitutes a normal distribution g1, and the portion whose intensity level is equal to or less than the threshold value (b) constitutes a normal distribution g0, calculate the mean value m1 and standard deviation s1 of the level 1, and the mean value m0 and standard deviation s0 of the level 0 by fitting the least squares method or the like (FIG. 9C).

(4) Calculate the following Q factor as the averaged Q-factor parameter from the mean values and standard deviations obtained in (3).

$$Qavg = |m1 - m0|/(s1 + s0)$$

Then, adopt s1 as a waveform distortion parameter. As the distribution functions g0 and g1, a chi-square distribution is also applicable (Reference [4]).

FIGS. 10A and 10C, and FIGS. 11A and 11B illustrate actual measurement results in the present embodiment.

FIGS. 10A–10C illustrate the optical signal amplitude histograms obtained from a 10 Gbit/s NRZ optical signal. FIG. 10A illustrates the case where the chromatic dispersion value is 340 ps/nm, and the minimum receiving optical power is –31 dBm; FIG. 10B illustrates the case where the chromatic dispersion value is 1360 ps/nm, and the minimum receiving optical power is –31 dBm; and FIG. 10C illustrates the case where the chromatic dispersion value is 340 ps/nm, and the minimum receiving optical power is –39 dBm.

Comparing FIG. 10A with FIG. 10B, it is seen that when no degradation in the optical signal-to-noise ratio occurs, but the waveform distortion takes place because of the chromatic dispersion, the amplitude histograms are varied, and that the standard deviation of the distribution at the level 1 (the peak at the greater amplitude side) increases so that the reduction in the averaged Q-factor is prospected to take place.

The variations in FIGS. 10A and 10C show that when no waveform distortion due to the chromatic dispersion occurs, but the degradation in the optical signal-to-noise ratio takes place, the amplitude histograms vary in such a manner that the difference between the mean values at the level 1 and level 0 sharply reduces, so that the reduction in the averaged Q-factor is likely to take place. Thus, the inclination can be confirmed that the causes of the averaged Q-factor reduction differ in the case where only the waveform distortion occurs and only the degradation in the optical signal-to-noise ratio takes place.

Figure 11B:
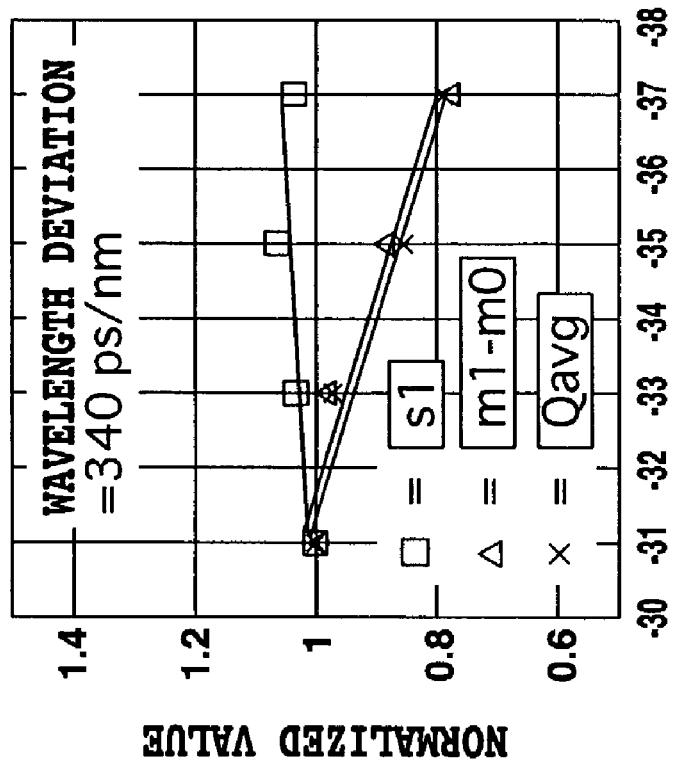
FIGS. 11A and 11B are graphs experimentally confirming the inclination that the causes of the averaged Q-factor reduction differ in the case where only the waveform distortion is present, and only the degradation in the optical signal-to-noise ratio is present.
Figure 11A:
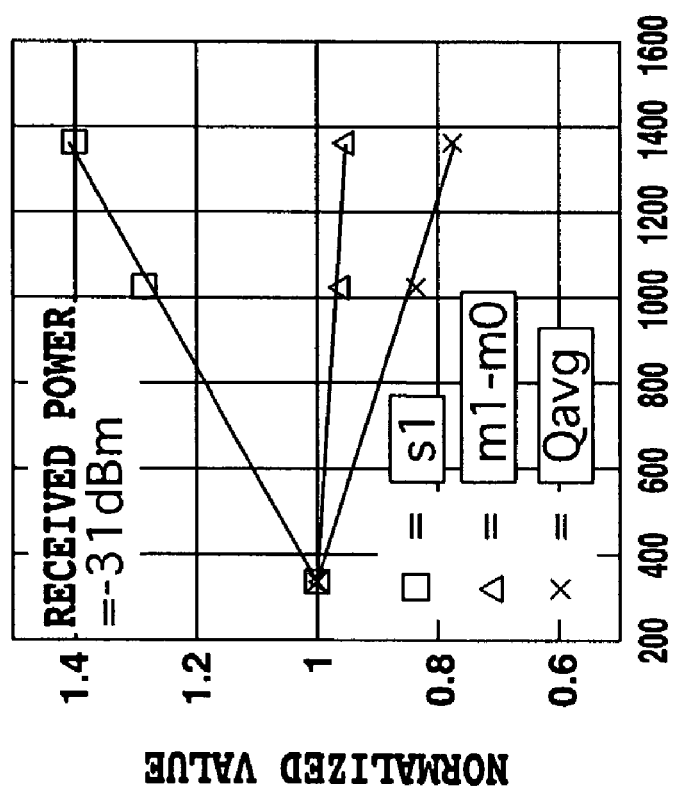

FIGS. 11A and 11B are graphs for confirming the foregoing considerations experimentally. Both the graphs plot the variations in the parameters on the assumption that the normalized value is one when the chromatic dispersion is 340 ps/nm and the minimum receiving optical power is –31 dBm.

The graph of FIG. 11A illustrates, with respect to the variations in the chromatic dispersion, the variations in the averaged Q-factor parameter, the variations in the waveform distortion parameter s1 and the variations in difference between the mean values at the levels 0 and 1. It shows that as the chromatic dispersion (the waveform distortion) increases, the averaged Q-factor parameter reduces and the waveform distortion parameter s1 increases.

The graph of FIG. 11B illustrates, with respect to the variations in the minimum receiving optical power, the variations in the averaged Q-factor parameter, the variations in the waveform distortion parameter s1 and the variations in the difference between the mean values at the levels 0 and 1. It shows that as the minimum receiving optical power (the optical signal-to-noise ratio) reduces, the averaged Q-factor parameter reduces and the waveform distortion parameter s1 varies only slightly. Thus, it can be distinguished from the waveform distortion of FIG. 11A.

(Second Embodiment)

Figure 12A:
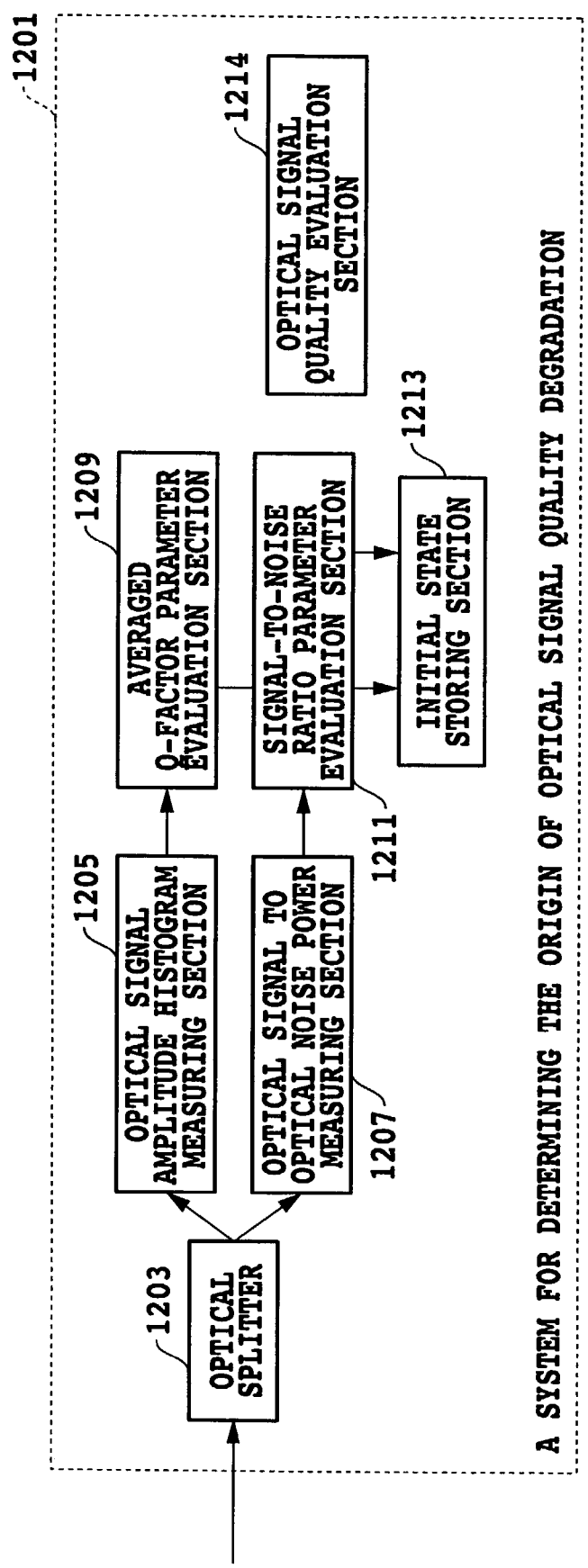
FIGS. 12A and 12B are block diagrams each showing a configuration of a system for determining the origin of optical signal quality degradation of a second embodiment in accordance with the present invention.
Figure 12B:
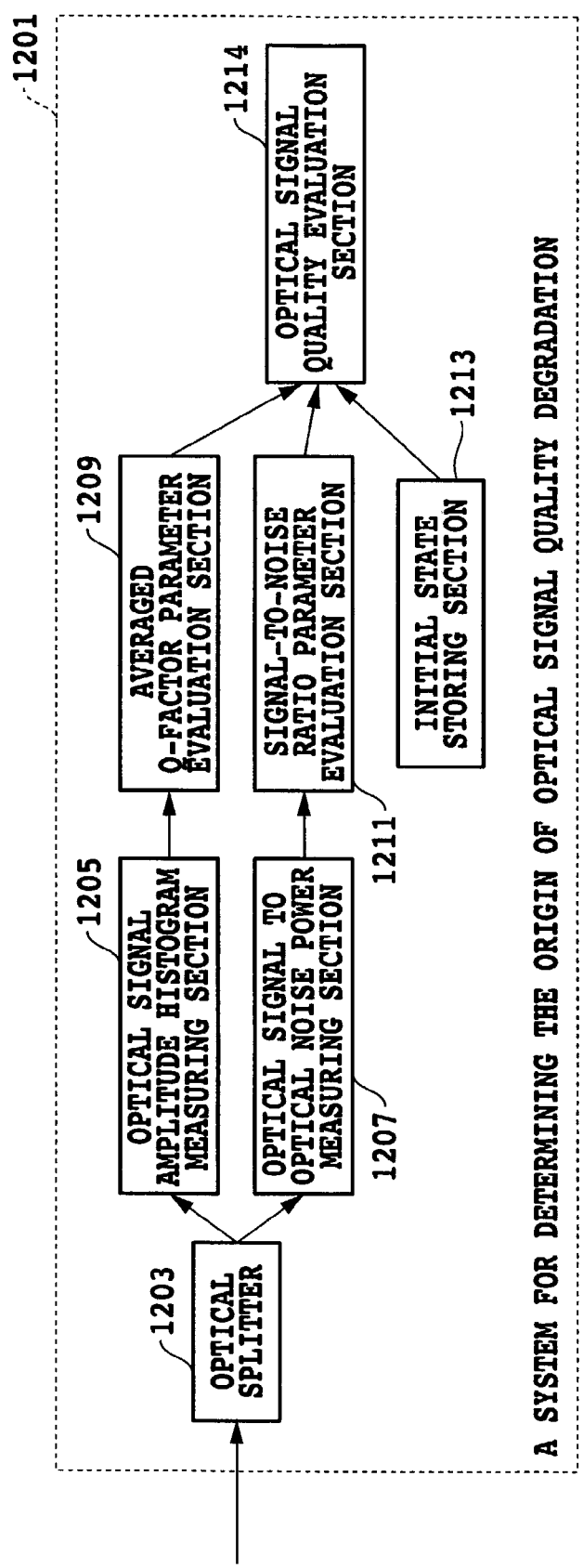

FIGS. 12A and 12B show a system for determining the origin of optical signal quality degradation of a second embodiment in accordance with the present invention. The system for determining the origin of optical signal quality degradation 1201 of the present embodiment comprises an optical splitter 1203, an optical signal amplitude histogram measuring section 1205, an optical signal to optical noise power measuring section 1207, an averaged Q-factor parameter evaluation section 1209, an optical signal-to-noise ratio parameter evaluation section 1211, an initial state storing section 1213, and an optical signal quality evaluation section 1214.

The optical splitter 1203 splits the optical signal under measurement. The optical signal amplitude histogram measuring section 1205 obtains the optical signal amplitude histogram from a first optical signal under measurement after the splitting. The optical signal to optical noise power measuring section 1207 measures the optical signal to optical noise power from a second optical signal under measurement after the splitting. The averaged Q-factor parameter evaluation section 1209 obtains the averaged Q-factor parameter which is the optical signal quality parameter, from the optical signal amplitude histogram obtained by the optical signal amplitude histogram measuring section 1205. The optical signal-to-noise ratio parameter evaluation section 1211 obtains the optical signal-to-noise ratio parameter which is the optical signal quality parameter, from the optical signal to optical noise power obtained by the optical signal amplitude histogram measuring section 1205. The initial state storing section 1213 stores into the storing medium the initial values or initial characteristics of the averaged Q-factor parameter and optical signal-to-noise ratio parameter at the system installation without the optical signal quality degradation.

The optical signal quality evaluation section 1214 evaluates the optical signal quality degradation factor using the measurement value of the averaged Q-factor parameter and measurement value of the optical signal-to-noise ratio parameter, and the initial values or initial characteristics of the averaged Q-factor parameter and optical signal-to-noise ratio parameter at the system installation without the optical signal quality degradation, which are stored in the storing medium. In this case, it decides as to whether the main factor of the optical signal quality degradation is the degradation in the optical signal-to-noise ratio or not by determining and evaluating both the averaged Q-factor parameter and the optical signal-to-noise ratio parameter.

Figure 13:
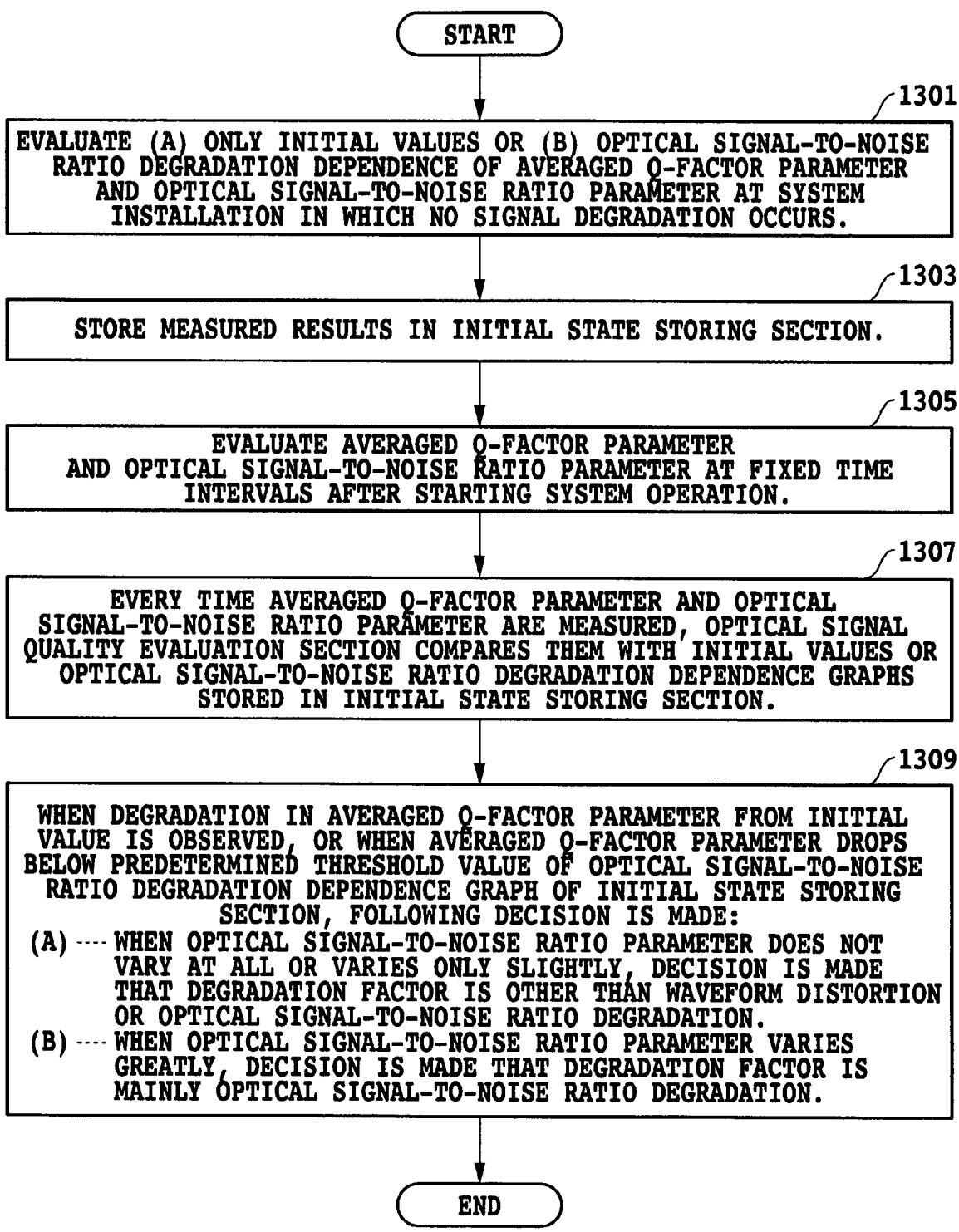
FIG. 13 is a flowchart illustrating an estimation algorithm of the optical signal degradation factors used by the system for determining the origin of optical signal quality degradation of the second embodiment in accordance with the present invention.

Next, the procedure of monitoring the optical signal quality degradation factor in the present embodiment will be described in detail with reference to FIG. 13.

Step 1301: Evaluate (a) only the initial values, or (b) the optical signal-to-noise ratio degradation dependence of the averaged Q-factor parameter and the optical signal-to-noise ratio parameter at the system installation without the signal degradation.

Step 1303: Store measurement results obtained at Step 1301 into the initial state storing section 1213 (see, FIG. 12A up to this step).

Step 1305: Evaluate the averaged Q-factor parameter and the optical signal-to-noise ratio parameter at fixed time intervals after the start of the system operation.

Step 1307: Every time the averaged Q-factor parameter and the optical signal-to-noise ratio parameter are measured, the optical signal quality evaluation section 1214 compares the measurement values with the initial values or the optical signal-to-noise ratio degradation dependence graph in the initial state storing section 1213.

Step 1309: When the degradation in the averaged Q-factor parameter from the initial value is observed, or when the averaged Q-factor parameter drops below a predetermined threshold value of the optical signal-to-noise ratio degradation dependence graph in the initial state storing section 1213, the following decision is made:

(a) When the optical signal-to-noise ratio parameter does not vary at all or varies only slightly, a decision is made that the degradation factor is other than the waveform distortion or the optical signal-to-noise ratio degradation.
(b) When the optical signal-to-noise ratio parameter varies greatly, a decision is made that the degradation factor is mainly the optical signal-to-noise ratio degradation (see, FIG. 12B up to this step).

The optical signal amplitude histogram measuring section 1205 can utilize a method using the electrical sampling or optical sampling as shown in the concrete examples of FIGS. 3–5B, the details of which are described in the foregoing first embodiment.

The averaged Q-factor parameter evaluation section 1209 can utilize the evaluation methods as shown in FIGS. 6A–9C, the details of which are described in the foregoing first embodiment.

The optical signal to optical noise power measuring section 1207 can utilize an optical spectrum analyzer, for example.

Figure 14:
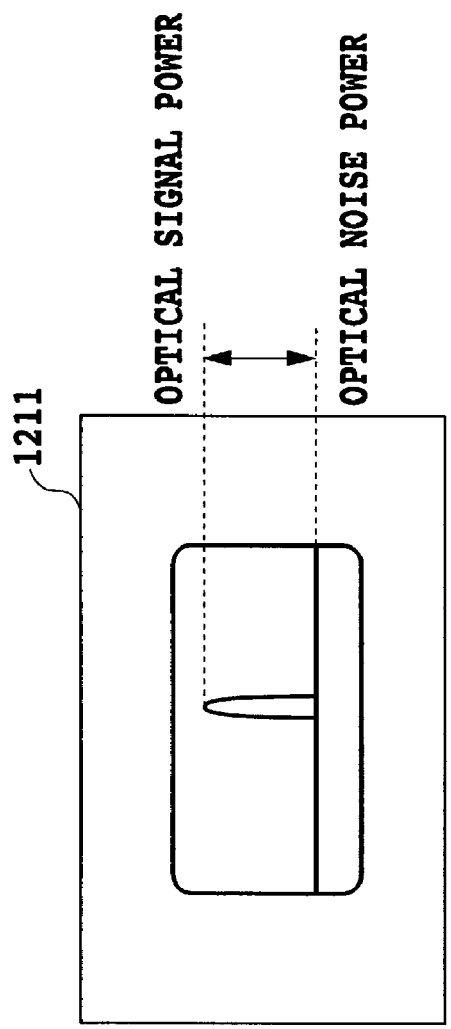
FIG. 14 is a schematic diagram illustrating a characteristic of the signal-to-noise ratio parameter evaluation section as shown in FIGS. 12A and 12B.

The optical signal-to-noise ratio parameter evaluation section 1211 can evaluate the optical signal-to-noise ratio parameter by the following expression as shown in FIG. 14.

optical signal − to − noise ratio (OSNR) =

10Log (optical signal power/optical noise power)

(Third Embodiment)

Figure 15A:
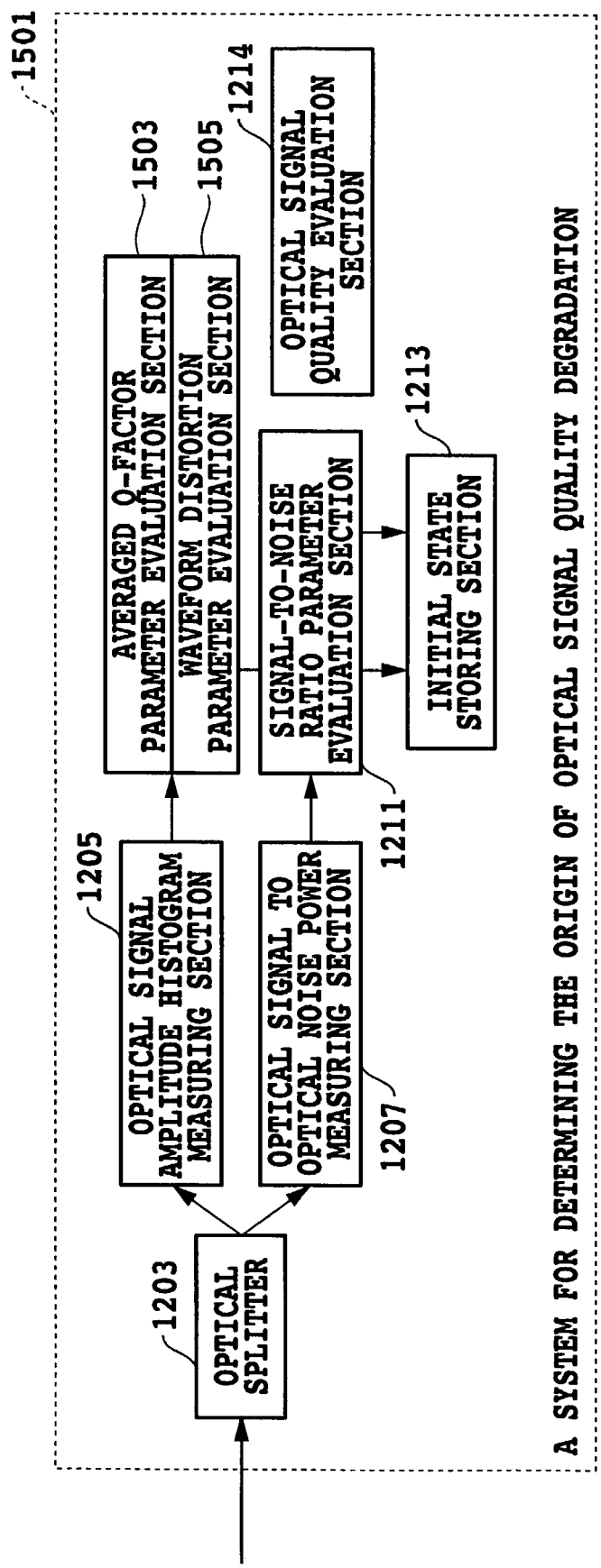
FIGS. 15A and 15B are block diagrams each showing a configuration of a system for determining the origin of optical signal quality degradation of a third embodiment in accordance with the present invention.
Figure 15B:
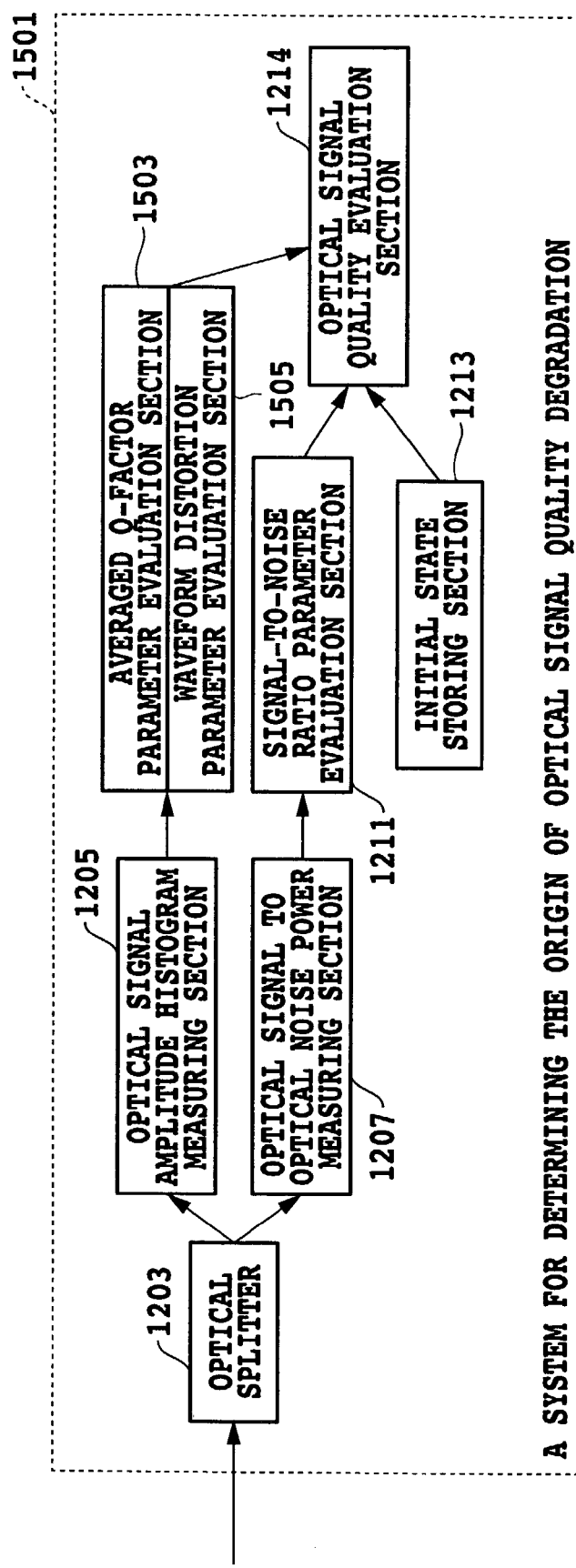

FIGS. 15A and 15B show a system for determining the origin of optical signal quality degradation of a third embodiment in accordance with the present invention. In FIGS. 15A and 15B, the same reference numerals designate the same or like portions to those of FIGS. 12A and 12B. The system for determining the origin of optical signal quality degradation 1501 of the present embodiment comprises an optical splitter 1203, an optical signal amplitude histogram measuring section 1205, an optical signal to optical noise power measuring section 1207, an averaged Q-factor param-eter evaluation section 1503, a waveform distortion parameter evaluation section 1505, an optical signal-to-noise ratio parameter evaluation section 1211, an initial state storing section 1213, and an optical signal quality evaluation section 1214.

The optical splitter 1203 splits the optical signal under measurement. The optical signal amplitude histogram measuring section 1205 obtains the optical signal amplitude histogram from a first optical signal under measurement after the splitting. The optical signal to optical noise power measuring section 1207 measures the optical signal to optical noise power from a second optical signal under measurement after the splitting. The averaged Q-factor parameter evaluation section 1503 obtains the averaged Q-factor parameter which is the optical signal quality parameter, from the optical signal amplitude histogram. The waveform distortion parameter evaluation section 1505 obtains the waveform distortion parameter which is the optical signal quality parameter, from the optical signal amplitude histogram. The optical signal-to-noise ratio parameter evaluation section 1211 obtains the optical signal-to-noise ratio parameter which is the optical signal quality parameter, from the optical signal to optical noise power. The initial state storing section 1213 stores into the storing medium the initial values or initial characteristics of the averaged Q-factor parameter, waveform distortion prameter and optical signal-to-noise ratio parameter, at the system installation without the optical signal quality degradation.

The optical signal quality evaluation section 1214 evaluates the optical signal quality degradation factor using the measurement value of the averaged Q-factor parameter, the measurement value of the waveform distortion parameter, and the measurement value of the optical signal-to-noise ratio parameter, and the initial values or initial characteristics at the system installation without the optical signal quality degradation, which are stored in the storing medium. In this case, it decides as to whether the main factor of the optical signal quality degradation is the degradation in the optical signal-to-noise ratio, or the waveform distortion or the other factors by determining and evaluating all the averaged Q-factor parameter, waveform distortion parameter, and optical signal-to-noise ratio parameter.

Figure 16:
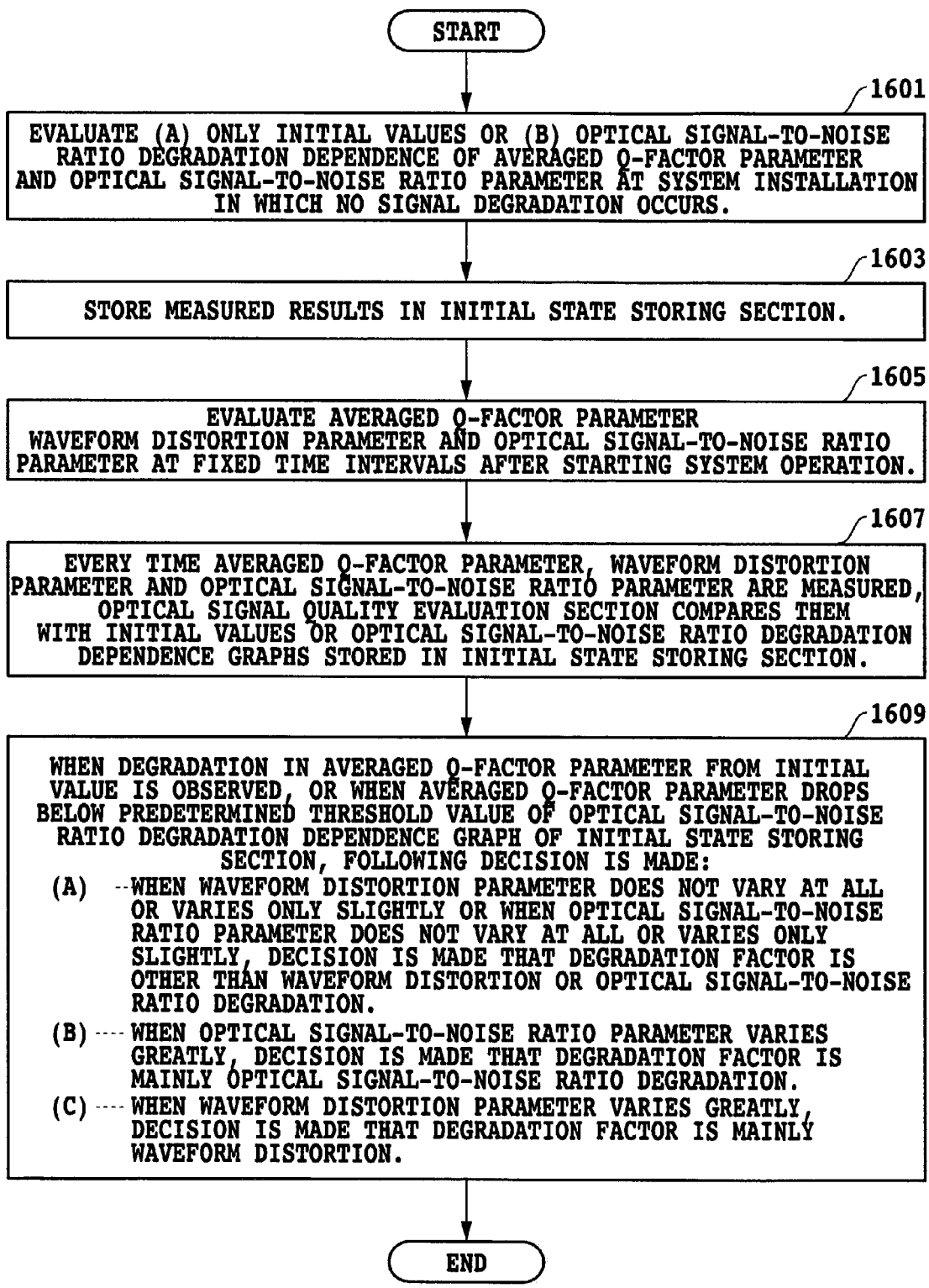
FIG. 16 is a flowchart illustrating an estimation algorithm of the optical signal degradation factors used by the system for determining the origin of optical signal quality degradation of the third embodiment in accordance with the present invention.
Figure 17:
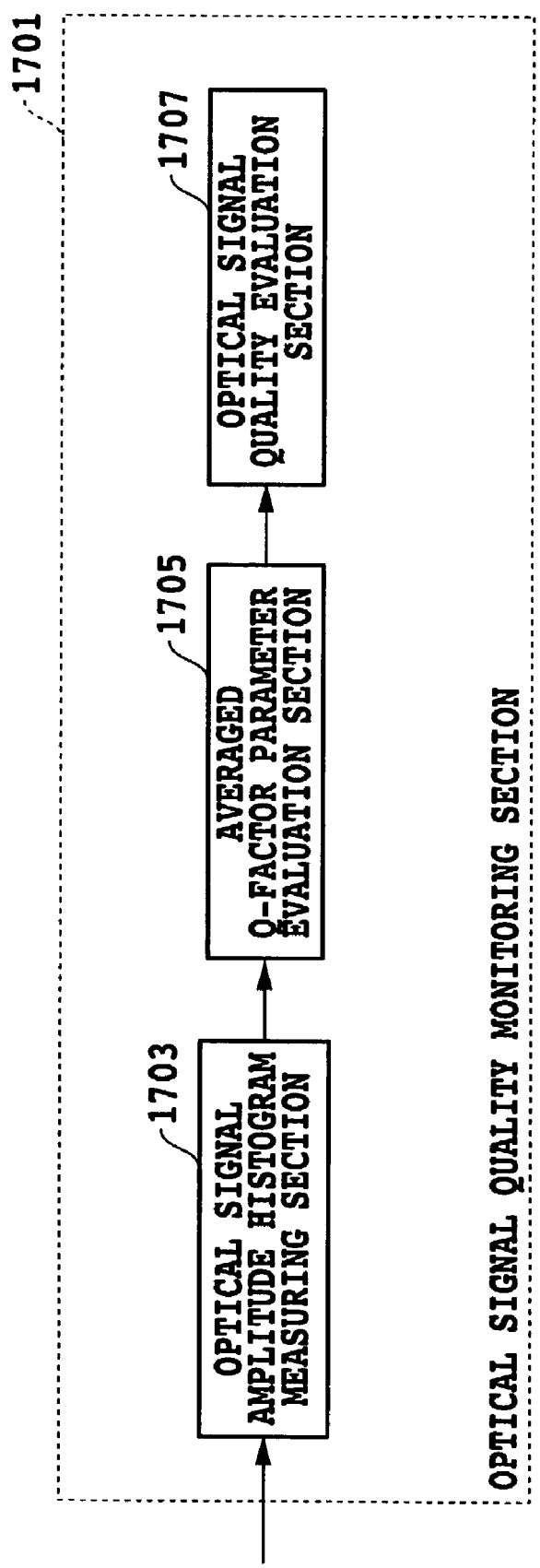
FIG. 17 is a block diagram showing a configuration of a conventional optical signal quality monitoring section.

Next, the procedure of monitoring the optical signal quality degradation factor in the present embodiment will be described in detail with reference to FIG. 16.

Step 1601: Evaluate (a) only the initial values, or (b) the optical signal-to-noise ratio degradation dependence, of the averaged Q-factor parameter, waveform distortion parameter and optical signal-to-noise ratio parameter at the system installation without the signal degradation.

Step 1603: Store measurement results obtained at Step 1601 into the initial state storing section 1213 (see, FIG. 15A up to this step).

Step 1605: Evaluate the averaged Q-factor parameter, the waveform distortion parameter and the optical signal-to-noise ratio parameter at fixed time intervals after the start of the system operation.

Step 1607: Every time the averaged Q-factor parameter, the waveform distortion parameter and the optical signal-to-noise ratio parameter are measured, the optical signal quality evaluation section 1214 compares the measurement values with the initial values or optical signal-to-noise ratio degradation dependence graph in the initial state storing section 1213.

Step 1609: When the degradation in the averaged Q-factor parameter from the initial value is observed, or when the averaged Q-factor parameter drops below a predetermined threshold value of the optical signal-to-noise ratio degradation dependence graph in the initial state storing section 1213, the following decision is made:

(a) When the waveform distortion parameter does not vary at all or varies only slightly, and the optical signal-to-noise ratio parameter does not vary at all or varies only slightly, a decision is made that the degradation factor is other than the waveform distortion or the optical signal-to-noise ratio degradation.

(b) When the optical signal-to-noise ratio parameter varies greatly, a decision is made that the degradation factor is mainly the optical signal-to-noise ratio degradation.

(c) When the waveform distortion parameter varies greatly, a decision is made that the degradation factor is mainly the waveform distortion (see, FIG. 15B up to this step).

The optical signal amplitude histogram measuring section 1205 can utilize a method using the electrical sampling or optical sampling as shown in the concrete examples of FIGS. 3–5B, the details of which are described in the foregoing first embodiment.

The averaged Q-factor parameter evaluation section 1503 can utilize the evaluation methods as shown in FIGS. 6A–9C, the details of which are described in the foregoing first embodiment.

The optical signal to optical noise power measuring section 1207 and the optical signal-to-noise ratio parameter evaluation section 1211 can utilize an evaluation method as shown in FIG. 14, the details of which are described in the second embodiment.

The present invention has been described in detail with respect to preferred embodiments, and it will now be apparent from the foregoing to those skilled in the art that changes and modifications may be made without departing from the invention in its broader aspect, and it is the intention, therefore, in the appended claims to cover all such changes and modifications as fall within the true spirit of the invention.

What is claimed is:

1. A method for determining the origin of optical signal quality degradation comprising:

an optical signal amplitude histogram measurement step of obtaining an optical signal amplitude histogram from an optical signal under measurement;

an averaged Q-factor parameter measurement step of obtaining an averaged Q-factor parameter, which is an optical signal quality parameter calculated from the optical signal amplitude histogram obtained in said optical signal amplitude histogram measurement step;

a waveform distortion parameter measurement step of obtaining a waveform distortion parameter, which is another optical signal quality parameter calculated from the optical signal amplitude histogram obtained in said optical signal amplitude histogram measurement step; and an optical signal quality evaluation step of evaluating an optical signal quality degradation factor using a measurement value of the averaged Q-factor parameter and a measurement value of the waveform distortion parameter obtained in said averaged Q-factor parameter measurement step and said waveform distortion parameter measurement step, wherein said optical signal quality evaluation step makes a decision that a main factor of the optical signal quality degradation is the waveform distortion in the optical signal under measurement when the averaged Q-factor parameter is reduced and the waveform distortion parameter is increased, and makes a decision that the main factor of the optical signal quality degradation is a factor other than waveform distortion when the waveform distortion parameter is not increased.

2. A method for determining the origin of optical signal quality degradation comprising:

an optical signal amplitude histogram measurement step of obtaining an optical signal amplitude histogram from an optical signal under measurement;

an averaged Q-factor parameter measurement step of obtaining an averaged Q-factor parameter, which is an optical signal quality parameter calculated from the optical signal amplitude histogram obtained in said optical signal amplitude histogram measurement step;

a waveform distortion parameter measurement step of obtaining a waveform distortion parameter, which is another optical signal quality parameter calculated from the optical signal amplitude histogram obtained in said optical signal amplitude histogram measurement step;

an initial state storing step of storing into a storage medium at least one of an initial value and initial characteristic of the averaged Q-factor parameter and the waveform distortion parameter at a system installation without optical signal quality degradation, which are obtained using said averaged Q-factor parameter measurement step and said waveform distortion parameter measurement step; and an optical signal quality evaluation step of evaluating an optical signal quality degradation factor using a measurement value of the averaged Q-factor parameter and a measurement value of the waveform distortion parameter obtained in said averaged Q-factor parameter measurement step and said waveform distortion parameter measurement step, and using at least one of the initial values and initial characteristics stored in the storage medium in said initial state storing step, wherein said optical signal quality evaluation step makes a decision that a main factor of the optical signal quality degradation is the waveform distortion in the optical signal under measurement when the averaged Q-factor parameter is reduced and the waveform distortion parameter is increased, and makes a decision that the main factor of the optical signal quality degradation is a factor other than waveform distortion when the waveform distortion parameter is not increased.

3. A method for determining the origin of optical signal quality degradation comprising:

an optical splitting step of splitting an optical signal under measurement;

an optical signal amplitude histogram measurement step of obtaining an optical signal amplitude histogram from a first optical signal under measurement which is obtained by splitting the optical signal under measurement in said optical splitting step;

an averaged Q-factor parameter measurement step of obtaining an averaged Q-factor parameter, which is an optical signal quality parameter calculated from the optical signal amplitude histogram obtained in said optical signal amplitude histogram measurement step;

an optical signal to optical noise power measurement step of measuring optical signal to optical noise power from a second optical signal under measurement which is obtained by splitting the optical signal under measurement in said optical splitting step;

an optical signal-to-noise ratio parameter obtaining step of obtaining an optical signal-to-noise ratio parameter, which is another optical signal quality parameter from the optical signal to optical noise power obtained in said optical signal to optical noise power measurement step; and an optical signal quality evaluation step of evaluating an optical signal quality degradation factor using a measurement value of the averaged Q-factor parameter obtained in said averaged Q-factor parameter measurement step and a measurement value of the optical signal-to-noise ratio parameter obtained in said optical signal-to-noise ratio parameter obtaining step, wherein said optical signal quality evaluation step makes a decision as to whether a main factor of the optical signal quality degradation is the degradation in the optical signal-to-noise ratio or not by determining and evaluating both the averaged Q-factor parameter and the optical signal-to-noise ratio parameter.

4. A method for obtaining the origin of optical signal quality degradation comprising:

an optical splitting step of splitting an optical signal under measurement;

an optical signal amplitude histogram measurement step of obtaining an optical signal amplitude histogram from a first optical signal under measurement which is obtained by splitting the optical signal under measurement in said optical splitting step;

an averaged Q-factor parameter measurement step of obtaining an averaged Q-factor parameters which is an optical signal quality parameter calculated from the optical signal amplitude histogram obtained in said optical signal amplitude histogram measurement step;

an optical signal to optical noise power measurement step of measuring optical signal to optical noise power from a second optical signal under measurement which is obtained by splitting the optical signal under measurement in said optical splitting step;

an optical signal-to-noise ratio parameter obtaining step of obtaining an optical signal-to-noise ratio parameter, which is another optical signal quality parameter from the optical signal to optical noise power obtained in said optical signal to optical noise power measurement step;

an initial state storing step of storing into a storage medium at least one of an initial value and initial characteristic of the averaged Q-factor parameter and of the optical signal-to-noise ratio parameter at a system installation without optical signal quality degradation, which are obtained using said averaged Q-factor parameter measurement step and said optical signal-to-noise ratio parameter obtaining step; and an optical signal quality evaluation step of evaluating an optical signal quality degradation factor using a measurement value of the averaged Q-factor parameter obtained in said averaged Q-factor parameter measurement step and a measurement value of the optical signal-to-noise ratio parameter obtained in said optical signal-to-noise ratio parameter obtaining step, and using at least one of the initial values and initial characteristics of the averaged Q-factor parameter and the optical signal-to-noise ratio parameter at the system installation without optical signal quality degradation, which are stored in the storage medium in said initial state storing step, wherein said optical signal quality evaluation step makes a decision as to whether a main factor of the optical signal quality degradation is the degradation in the optical signal-to-noise ratio or not by determining and evaluating both the averaged Q-factor parameter and the optical signal-to-noise ratio parameter.

5. A method for determining the origin of optical signal quality degradation comprising:

an optical splitting step of splitting an optical signal under measurement;

an optical signal amplitude histogram measurement step of obtaining an optical signal amplitude histogram from a first optical signal under measurement which is obtained by splitting the optical signal under measurement in said optical splitting step;

an optical signal to optical noise power measurement step of measuring optical signal to optical noise power from a second optical signal under measurement which is obtained by splitting the optical signal under measurement in said optical splitting step;

a waveform distortion parameter measurement step of obtaining a waveform distortion parameter, which is an optical signal quality parameter from the optical signal amplitude histogram obtained in said optical signal amplitude histogram measurement step;

an optical signal-to-noise ratio parameter obtaining step of obtaining an optical signal-to-noise ratio parameter which is an optical signal quality parameter from the optical signal to optical noise power obtained in said optical signal to optical noise power measurement step; and an optical signal quality evaluation step of evaluating an optical signal quality degradation factor using a measurement value of the waveform distortion parameter obtained in said waveform distortion parameter measurement step, and a measurement value of the optical signal-to-noise ratio parameter obtained in said optical signal-to-noise ratio parameter obtaining step, wherein said optical signal quality evaluation step makes a decision as to whether a main factor of the optical signal quality degradation is the degradation in the optical signal-to-noise ratio or the waveform distortion by determining and evaluating both the waveform distortion parameter and the optical signal-to-noise ratio parameter.

6. A method for determining the origin of optical signal quality degradation comprising:

an optical splitting step of splitting an optical signal under measurement;

an optical signal amplitude histogram measurement step of obtaining an optical signal amplitude histogram from a first optical signal under measurement which is obtained by splitting the optical signal under measurement in said optical splitting step;

an optical signal to optical noise power measurement step of measuring optical signal to optical noise power from a second optical signal under measurement which is obtained by splitting the optical signal under measurement in said optical splitting step;

a waveform distortion parameter measurement step of obtaining a waveform distortion paramete, which is an optical signal quality parameter calculated from the optical signal amplitude histogram obtained in said optical signal amplitude histogram measurement step;

an optical signal-to-noise ratio parameter obtaining step of obtaining an optical signal-to-noise ratio parameter, which is another optical signal quality parameter from the optical signal to optical noise power obtained in said optical signal to optical noise power measurement step;

an initial state storing step of storing into a storage medium at least one of an initial value and initial characteristic of the waveform distortion parameter and that of the optical signal-to-noise ratio parameter at a system installation without optical signal quality degradation, which are obtained using said waveform distortion parameter measurement step and said optical signal-to-noise ratio parameter obtaining step; and an optical signal quality evaluation step of evaluating an optical signal quality degradation factor using a measurement value of the waveform distortion parameter obtained in said waveform distortion parameter measurement step and a measurement value of the optical signal-to-noise ratio parameter obtained in said optical signal-to-noise ratio parameter obtaining step, and using at least one of the initial values and initial characteristics of the waveform distortion parameter and that of the optical signal-to-noise ratio parameter at the system installation without optical signal quality degradation, wherein said optical signal quality evaluation step makes a decision as to whether a main factor of the optical signal quality degradation is the degradation in the optical signal-to-noise ratio or the waveform distortion by determining and evaluating both the waveform distortion parameter and the optical signal-to-noise ratio parameter.

7. A method for determining the origin of optical signal quality degradation comprising:

an optical splitting step of splitting an optical signal under measurement;

an optical signal amplitude histogram measurement step of obtaining an optical signal amplitude histogram from a first optical signal under measurement which is obtained by splitting the optical signal under measurement in said optical splitting step;

an averaged Q-factor parameter measurement step of obtaining an averaged Q-factor parameter, which is an optical signal quality parameter calculated from the optical signal amplitude histogram obtained in said optical signal amplitude histogram measurement step;

an optical signal to optical noise power measurement step of measuring optical signal to optical noise power from a second optical signal under measurement which is obtained by splitting the optical signal under measurement in said optical splitting step;

a waveform distortion parameter measurement step of obtaining a waveform distortion parameter, which is another optical signal quality parameter calculated from the optical signal amplitude histogram obtained in said optical signal amplitude histogram measurement step;

an optical signal-to-noise ratio parameter obtaining step of obtaining an optical signal-to-noise ratio parameter, which is another optical signal quality parameter from the optical signal to optical noise power obtained in said optical signal to optical noise power measurement step; and an optical signal quality evaluation step of evaluating an optical signal quality degradation factor using a measurement value of the averaged Q-factor parameter obtained in said averaged Q-factor parameter measurement step, a measurement value of the waveform distortion parameter obtained in said waveform distortion parameter measurement step, and a measurement value of the optical signal-to-noise ratio parameter obtained in said optical signal-to-noise ratio parameter obtaining step, wherein said optical signal quality evaluation step makes a decision as to whether a main factor of the optical signal quality degradation is the degradation in the optical signal-to-noise ratio or the waveform distortion or not by determining and evaluating all of the averaged Q-factor parameter, the waveform distortion parameter1 and the optical signal-to-noise ratio parameter.

8. A method for determining the origin of optical signal quality degradation comprising:

an optical splitting step of splitting an optical signal under measurement;

an optical signal amplitude histogram measurement step of obtaining an optical signal amplitude histogram from a first optical signal under measurement, which is obtained by splitting the optical signal under measurement in said optical splitting step;

an averaged Q-factor parameter measurement step of obtaining an averaged Q-factor parameter1, which is an optical signal quality parameter calculated from the optical signal amplitude histogram obtained in said optical signal amplitude histogram measurement step;

an optical signal to optical noise power measurement step of measuring optical signal to optical noise power from a second optical signal under measurement which is obtained by splitting the optical signal under measurement in said optical splitting step;

a waveform distortion parameter measurement step of obtaining a waveform distortion parameter, which is another optical signal quality parameter calculated from the optical signal amplitude histogram obtained in said optical signal amplitude histogram measurement step;

an optical signal-to-noise ratio parameter obtaining step of obtaining an optical signal-to-noise ratio parameter, which is another optical signal quality parameter from the optical signal to optical noise power obtained in said optical signal to optical noise power measurement step;

an initial state storing step of storing into a storage medium at least one of an initial value and an initial characteristic of the averaged Q-factor parameter, that of the waveform distortion parameter, and that of the optical signal-to-noise ratio parameter at a system installation without optical signal quality degradation, which are obtained using said averaged Q-factor parameter measurement step, said waveform distortion parameter measurement step and said optical signal-to-noise ratio parameter obtaining step; and an optical signal quality evaluation step of evaluating an optical signal quality degradation factor using a measurement value of the averaged Q-factor parameter obtained in said averaged Q-factor parameter measurement step, a measurement value of the waveform distortion parameter obtained in said waveform distortion parameter measurement step, and a measurement value of the optical signal-to-noise ratio parameter obtained in said optical signal-to-noise ratio parameter obtaining step, and using at least one of the initial values and initial characteristics of the averaged Q-factor parameter, that of the waveform distortion parameter, and the optical signal-to-noise ratio parameter at the system installation without optical signal quality degradation, which are stored into the storage medium by said initial state storing step, wherein said optical signal quality evaluation step makes a decision as to whether a main factor of the optical signal quality degradation is degradation in the optical signal-to-noise ratio, the waveform distortion or not by determining and evaluating all the averaged Q-factor parameter, the waveform distortion parameter, and the optical signal-to-noise ratio parameter.

9. The method for determining the origin of optical signal quality degradation as claimed in any one of claims 1–8, wherein said optical signal amplitude histogram measurement step comprises:

an opto-electric conversion step of converting the optical signal under measurement with a bit rate of $f_0$ (bits per second) into an electric intensity modulated signal;

an electrical sampling step of sampling the electric intensity modulated signal obtained in said opto-electric conversion step with a sampling clock having a repetition frequency of $$f_1(\text{Hz}) = \frac{n}{m} * f_0 + a,$$

where n and m are natural numbers, and a is an offset frequency; and a histogram evaluation step of obtaining an optical signal intensity distribution from the sampled signal obtained in said electrical sampling step, and of obtaining the optical signal amplitude histogram from the optical signal intensity distribution within an average time period.

10. The method for determining the origin of optical signal quality degradation as claimed in any one of claims 1–8, wherein said optical signal amplitude histogram measurement step comprises:

an optical combining step of combining the optical signal under measurement of a bit rate $f_0$ (bits per second) with a sampling optical pulse train whose repetition frequency is $$f_1(\text{Hz}) = \frac{n}{m} * f_0 + a,$$

where n and m are a natural numbers, and a is an offset frequency, and whose pulse width is substantially narrower than a time slot with a bit rate of $f_0$ (bits per second);

a cross-correlation optical signal generating step of obtaining a cross-correlation optical signal by launching the combined light which is combined in said optical combining step into a nonlinear optical medium for inducing nonlinear interaction between the optical signal under measurement and the sampling optical pulse train;

an optical splitting step of splitting the cross-correlation optical signal obtained in said cross-correlation optical signal generating step from the optical signal under measurement and the sampling optical pulse train;

an opto-electric conversion step of converting the cross-correlation optical signal obtained by said splitting in said optical splitting step into an electric intensity modulated signal; and a histogram evaluation step of obtaining an optical signal intensity distribution from the electric intensity modulated signal obtained in said opto-electric conversion step, and obtaining the optical signal amplitude histogram from the optical signal intensity distribution within the average time period.

11. The method for determining the origin of optical signal quality degradation as claimed in any one of claims 1–8, wherein said optical signal amplitude histogram measurement step comprises:

an optical gating step of sampling the optical signal under measurement with a bit rate of $f_0$ (bits per second) with a sampling clock, said sampling clock having a repetition frequency of $$f_1(\text{Hz}) = \frac{n}{m} * f_0 + a,$$

where n and m are a natural numbers, and a is an offset frequency;

an opto-electric conversion step of converting the sampled optical signal obtained in said optical gating step into a sampled electric signal; and a histogram evaluation step of obtaining an optical signal intensity distribution from the sampled electric signal obtained in said opto-electric conversion step, and of obtaining the optical signal amplitude histogram from the optical signal intensity distribution within an average time period.

12. The method for determining the origin of optical signal quality degradation as claimed in any one of claims 1, 2 and 5–8, wherein said averaged Q-factor parameter measurement step and said waveform distortion parameter measurement step comprise the steps of:

estimating an amplitude histogram distribution function g1 associated with a "level 1" from a portion of the amplitude histogram greater than a first predetermined intensity threshold value;

estimating an amplitude histogram distribution function g0 associated with a "level 0" from a portion of the amplitude histogram less than a second predetermined intensity threshold value;

obtaining mean intensity values and standard deviations of the "level 1" and the "level 0" from the functions g1 and g0;

calculating the averaged Q-factor parameter as a ratio of a difference between the mean intensity values of the "level 1" and the "level 0" to the sum of the standard deviations of the "level 1" and the "level 0"; and adopting at least one of the standard deviation of the "level 1", the standard deviation of the "level 0", and the difference between the mean intensity values of the "level 1" and the "level 0" as the waveform distortion parameter.

13. The method for determining the origin of optical signal quality degradation as claimed in any one of claims 1, 2 and 5–8, wherein said optical signal amplitude histogram measurement step comprises:

an opto-electric conversion step of converting the optical signal under measurement with a bit rate of $f_0$ (bits per second) into an electric intensity modulated signal;

an electrical sampling step of obtaining a sampled signal by sampling the electric intensity modulated signal obtained in said opto-electric conversion step with a sampling clock having a repetition frequency of $$\frac{n}{m} * f_0 + a,$$

where n and m are natural numbers and a is an offset frequency; and a histogram evaluation step of obtaining an optical signal intensity distribution from the sampled signal obtained in said electrical sampling step, and of obtaining the optical signal amplitude histogram from the optical signal intensity distribution within an average time period, wherein said averaged Q-factor parameter measurement step and said waveform distortion parameter measurement step comprise the steps of:

estimating an amplitude histogram distribution function g1 associated with a "level 1" from a portion of the amplitude histogram greater than a first predetermined intensity threshold value, estimating an amplitude histogram distribution function g0 associated with a "level 0" from a portion of the amplitude histogram less than another predetermined intensity threshold value, obtaining mean intensity values and standard deviations of the "level 1" and the "level 0" from the functions g1 and g0, calculating the averaged Q-factor parameter as a ratio of a difference between the mean intensity values of the "level 1" and the "level 0" to the sum of the standard deviations of the "level 1" and the "level 0, and adopting at least one of the standard deviation of the "level 1", the standard deviation of the "level 0", and the difference between the mean intensity values of the "level 1" and the "level 0" as the waveform distortion parameter.

14. The method for determining the origin of optical signal quality degradation as claimed in any one of claims 1, 2 and 5–8, wherein said optical signal amplitude histogram measurement step comprises:

an optical combining step of combining the optical signal under measurement of a bit rate $f_0$ (bits per second) with a sampling optical pulse train whose repetition frequency is $$f_1(Hz) = \frac{n}{m} * f_0 + a,$$

where n and m are natural numbers, and a is an offset frequency whose pulse width is substantially narrower than a time slot with a bit rate of $f_0$ (bits per second);

a cross-correlation optical signal generating step of obtaining a cross-correlation optical signal by launching the combined light which is combined in said optical combining step into a nonlinear optical medium for inducing nonlinear interaction between the optical signal under measurement and the sampling optical pulse train;

an optical splitting step of splitting the cross-correlation optical signal obtained in said cross-correlation optical signal generating step from the optical signal under measurement and the sampling optical pulse train;

an opto-electric conversion step of converting the cross-correlation optical signal, obtained by said splitting in said optical splitting step, into an electric intensity modulated signal; and a histogram evaluation step of obtaining an optical signal intensity distribution from the electric intensity modulated signal obtained in said opto-electric conversion step, and of obtaining the optical signal amplitude histogram from the optical signal intensity distribution within the average time period, wherein said averaged Q-factor parameter measurement step and said waveform distortion parameter measurement step comprise the steps of:

estimating an amplitude histogram distribution function g1 associated with a "level 1" from a portion of the amplitude histogram greater than a first predetermined intensity threshold value, estimating an amplitude histogram distribution function g0 associated with a "level 0" from a portion of the amplitude histogram less than a second predetermined intensity threshold value, obtaining mean intensity values and standard deviations of the "level 1" and the "level 0" from the functions g1 and g0, calculating the averaged Q-factor parameter as a ratio of a difference between the mean intensity values of the "level 1" and the "level 0" to the sum of the standard deviations of the "level 1" and the "level 0", and adopting at least one 6f the standard deviation of the "level 1", the standard deviation of the "level 0", and the difference between the mean intensity values of the "level 1" and the "level 0" as the waveform distortion parameter.

15. The method for determining the origin of optical signal quality degradation as claimed in any one of claims 1, 2 and 5–8, wherein said optical signal amplitude histogram measurement step comprises:

an optical gating step of sampling the optical signal under measurement with a bit rate of $f_0$ (bits per second) with a sampling clock, said sampling clock having a repetition frequency of $$(Hz) = \frac{n}{m} * f_0 + a,$$

where n and m are natural numbers, and a is an offset frequency;

an opto-electric conversion step of converting the sampled optical signal obtained in said optical gating step into a sampled electric signal; and a histogram evaluation step of obtaining an optical signal intensity distribution from the sampled electric signal obtained in said opto-electric conversion step, and of obtaining the optical signal amplitude histogram from the optical signal intensity distribution within an average time period, wherein said averaged Q-factor parameter measurement step and said waveform distortion parameter measurement step comprise the steps of:

estimating an amplitude histogram distribution function g1 associated with a "level 1" from a portion of the amplitude histogram greater than a first predetermined intensity threshold value, estimating an amplitude histogram distribution function g0 associated with a "level 0" from a portion of the amplitude histogram less than a second predetermined intensity threshold value, obtaining mean intensity values and standard deviations of the "level 1" and the "level 0" from the functions g1 and g0, calculating the averaged Q-factor parameter as a ratio of a difference between the mean intensity values of the "level 1" and the "level 0" to the sum of the standard deviations of the "level 1" and the "level 0", and adopting at least one of the standard deviation of the "level 1", the standard deviation of the "level 0", and the difference between the mean intensity values of the "level 1" and the "level 0" as the waveform distortion parameter.

16. A system for determining the origin of optical signal quality degradation comprising:

optical signal amplitude histogram measurement means for obtaining an optical signal amplitude histogram from an optical signal under measurement;

averaged Q-factor parameter measurement means for obtaining an averaged Q-factor parameter, which is an optical signal quality parameter calculated from the optical signal amplitude histogram obtained by said optical signal amplitude histogram measurement means;

waveform distortion parameter measurement means for obtaining a waveform distortion parameter, which is another optical signal quality parameter calculated from the optical signal amplitude histogram obtained by said optical signal amplitude histogram measurement means; and optical signal quality evaluation means for evaluating an optical signal quality degradation factor using a measurement value of the averaged Q-factor parameter and a measurement value of the waveform distortion parameter obtained by said averaged Q-factor parameter measurement means and said waveform distortion parameter measurement means, wherein said optical signal quality evaluation means makes a decision that a main factor of the optical signal quality degradation is the waveform distortion in the optical signal under measurement when the averaged Q-factor parameter is reduced and the waveform distortion parameter is increased, and makes a decision that the main factor of the optical signal quality degradation is a factor other than waveform distortion when the waveform distortion parameter is not increased.

17. A system for determining the origin of optical signal quality degradation comprising:

optical signal amplitude histogram measurement means for obtaining an optical signal amplitude histogram from an optical signal under measurement;

averaged Q-factor parameter measurement means for obtaining an averaged Q-factor parameter, which is an optical signal quality parameter calculated from the optical signal amplitude histogram obtained by said optical signal amplitude histogram measurement means;

waveform distortion parameter measurement means for obtaining a waveform distortion parameter, which is another optical signal quality parameter calculated from the optical signal amplitude histogram obtained by said optical signal amplitude histogram measurement means;

initial state storing means for storing into a storage medium at least one of an initial value and an initial characteristic of the averaged Q-factor parameter and that of the waveform distortion parameter at a system installation without optical signal quality degradation, which are obtained using said averaged Q-factor parameter measurement means and said waveform distortion parameter measurement means; and optical signal quality evaluation means for evaluating an optical signal quality degradation factor using a measurement value of the averaged Q-factor parameter and a measurement value of the waveform distortion parameter obtained by said averaged Q-factor parameter measurement means and said waveform distortion parameter measurement means, and using at least one of the initial values and initial characteristics stored in said storage medium in said initial state storing means, wherein said optical signal quality evaluation means makes a decision that a main factor of the optical signal quality degradation is the waveform distortion in the optical signal under measurement when the averaged Q-factor parameter is reduced and the waveform distortion parameter is increased, and makes a decision that the main factor of the optical signal quality degradation is a factor other than waveform distortion when the waveform distortion parameter is not increased.

18. A system for determining the origin of optical signal quality degradation comprising:

optical splitting means for splitting an optical signal under measurement;

optical signal amplitude histogram measurement means for obtaining an optical signal amplitude histogram from a first optical signal under measurement which is obtained by splitting the optical signal under measurement in said optical splitting means;

averaged Q-factor parameter measurement means for obtaining an averaged Q-factor parameter, which is an optical signal quality parameter calculated from the optical signal amplitude histogram obtained by said optical signal amplitude histogram measurement means;

optical signal to optical noise power measurement means for measuring optical signal to optical noise power from a second optical signal under measurement which is obtained by splitting the optical signal under measurement in said optical splitting means;

optical signal-to-noise ratio parameter obtaining means for obtaining an optical signal-to-noise ratio parameter, which is another optical signal quality parameter from the optical signal to optical noise power obtained by said optical signal to optical noise power measurement means; and optical signal quality evaluation means for evaluating an optical signal quality degradation factor using a measurement value of the averaged Q-factor parameter obtained by said averaged Q-factor parameter measurement means and a measurement value of the optical signal-to-noise ratio parameter obtained by said optical signal-to-noise ratio parameter obtaining means, wherein said optical signal quality evaluation means makes a decision as to whether a main factor of the optical signal quality degradation is the degradation in the optical signal-to-noise ratio or not by determining and evaluating both the averaged Q-factor parameter and the optical signal-to-noise ratio parameter.

19. A system for determining the origin of optical signal quality degradation comprising:
optical splitting means for splitting a optical signal under measurement;
optical signal amplitude histogram measurement means for obtaining an optical signal amplitude histogram from a first optical signal under measurement which is obtained by splitting the optical signal under measurement in said optical splitting means;
averaged Q-factor parameter measurement means for obtaining an averaged Q-factor parameter, which is an optical signal quality parameter calculated from the optical signal amplitude histogram obtained by said optical signal amplitude histogram measurement means;
optical signal to optical noise power measurement means for measuring optical signal to optical noise power from a second optical signal under measurement which is obtained by splitting the optical signal under measurement in said optical splitting means;
optical signal-to-noise ratio parameter obtaining means for obtaining an optical signal-to-noise ratio parameter, which is an optical signal quality parameter from the optical signal to optical noise power obtained by said optical signal to optical noise power measurement means;
initial state storing means for storing into a storage medium at least one of an initial value and initial characteristic of the averaged Q-factor parameter and that of the optical signal-to-noise ratio parameter at a system installation without optical signal quality degradation, which are obtained using said averaged Q-factor parameter measurement means and said optical signal-to-noise ratio parameter obtaining means; and
optical signal quality evaluation means for evaluating an optical signal quality degradation factor using a measurement value of the averaged Q-factor parameter obtained by said averaged Q-factor parameter measurement means and a measurement value of the optical signal-to-noise ratio parameter obtained by said optical signal-to-noise ratio parameter obtaining means, and using at least one of the initial values and initial characteristics of the averaged Q-factor parameter and that of the optical signal-to-noise ratio parameter at the system installation without optical signal quality degradation, which are stored in the storage medium in said initial state storing means,
wherein said optical signal quality evaluation means makes a decision as to whether a main factor of the optical signal quality degradation is the degradation in the optical signal-to-noise ratio or not by determining and evaluating both the averaged Q-factor parameter and the optical signal-to-noise ratio parameter.

20. A system for determining the origin of optical signal quality degradation comprising:
optical splitting means for splitting an optical signal under measurement;
optical signal amplitude histogram measurement means for obtaining an optical signal amplitude histogram from a first optical signal under measurement which is obtained by splitting the optical signal under measurement in said optical splitting means;
optical signal to optical noise power measurement means for measuring optical signal to optical noise power from a second optical signal under measurement which is obtained by splitting the optical signal under measurement by said optical splitting means;
waveform distortion parameter measurement means for obtaining a waveform distortion parameter1 which is an optical signal quality parameter calculated from the optical signal amplitude histogram obtained by said optical signal amplitude histogram measurement means;
optical signal-to-noise ratio parameter obtaining means for obtaining an optical signal-to-noise ratio parameter, which is another optical signal quality parameter from the optical signal to optical noise power obtained by said optical signal to optical noise power measurement means; and
optical signal quality evaluation means for evaluating an optical signal quality degradation factor using a measurement value of the waveform distortion parameter obtained by said waveform distortion parameter measurement means and a measurement value of the optical signal-to-noise ratio parameter obtained by said optical signal-to-noise ratio parameter obtaining means,
wherein said optical signal quality evaluation means makes a decision as to whether a main factor of the optical signal quality degradation is the degradation in the optical signal-to-noise ratio or the waveform distortion by determining and evaluating both the waveform distortion parameter and the optical signal-to-noise ratio parameter.

21. A system for determining the origin of optical signal quality degradation comprising:
optical splitting means for splitting an optical signal under measurement;
optical signal amplitude histogram measurement means for obtaining an optical signal amplitude histogram from a first optical signal under measurement obtained by splitting the optical signal under measurement in said optical splitting means;
optical signal to optical noise power measurement means for measuring optical signal to optical noise power from a second optical signal under measurement which is obtained by splitting the optical signal under measurement by said optical splitting means;
waveform distortion parameter measurement means for obtaining a waveform distortion parameter, which is an optical signal quality parameter calculated from the optical signal amplitude histogram obtained by said optical signal amplitude histogram measurement means;
optical signal-to-noise ratio parameter obtaining means for obtaining an optical signal-to-noise ratio parameter, which is another optical signal quality parameter from the optical signal to optical noise power obtained by said optical signal to optical noise power measurement means;
initial state storing means for storing into a storage medium at least one of an initial value and initial characteristic of the waveform distortion parameter and that of the optical signal-to-noise ratio parameter at a system installation without optical signal quality degradation, which are obtained using said waveform distortion parameter measurement means and said optical signal-to-noise ratio parameter obtaining means; and
optical signal quality evaluation means for evaluating an optical signal quality degradation factor using a measurement value of the waveform distortion parameter obtained by said waveform distortion parameter measurement means and a measurement value of the optical signal-to-noise ratio parameter obtained by said optical signal-to-noise ratio parameter obtaining means, and using at least one of the initial values and initial characteristics of the waveform distortion parameter and that of the optical signal-to-noise ratio parameter at the system installation without optical signal quality degradation, wherein said optical signal quality evaluation means makes a decision as to whether a main factor of the optical signal quality degradation is the degradation in the optical signal-to-noise ratio or the waveform distortion by determining and evaluating both the waveform distortion parameter and the optical signal-to-noise ratio parameter.

22. A system for determining the origin of optical signal quality degradation comprising:

optical splitting means for splitting an optical signal under measurement;

optical signal amplitude histogram measurement means for obtaining an optical signal amplitude histogram from a first optical signal under measurement which is obtained by splitting the optical signal under measurement in said optical splitting means;

averaged Q-factor parameter measurement means for obtaining an averaged Q-factor parameters which is an optical signal quality parameter calculated from the optical signal amplitude histogram obtained by said optical signal amplitude histogram measurement means;

optical signal to optical noise power measurement means for measuring optical signal to optical noise power from a second optical signal under measurement which is obtained by splitting the optical signal under measurement in said optical splitting means;

waveform distortion parameter measurement means for obtaining a waveform distortion parameter, which is another optical signal quality parameter calculated from the optical signal amplitude histogram obtained by said optical signal amplitude histogram measurement means;

optical signal-to-noise ratio parameter obtaining means for obtaining an optical signal-to-noise ratio parameter, which is another optical signal quality parameter from the optical signal to optical noise power obtained by said optical signal to optical noise power measurement means; and optical signal quality evaluation means for evaluating an optical signal quality degradation factor using a measurement value of the averaged Q-factor parameter obtained by said averaged Q-factor parameter measurement means, a measurement value of the waveform distortion parameter obtained by said waveform distortion parameter measurement means, and a measurement value of the optical signal-to-noise ratio parameter obtained by said optical signal-to-noise ratio parameter obtaining means, wherein said optical signal quality evaluation means makes a decision as to whether a main factor of the optical signal quality degradation is the degradation in the optical signal-to-noise ratio, the waveform distortion or not by determining and evaluating all the averaged Q-factor parameter, the waveform distortion parameter and the optical signal-to-noise ratio parameter.

23. A system for determining the origin of optical signal quality degradation comprising:

optical splitting means for splitting an optical signal under measurement;

optical signal amplitude histogram measurement means for obtaining an optical signal amplitude histogram from a first optical signal under measurement, which is obtained by splitting the optical signal under measurement in said optical splitting means;

averaged Q-factor parameter measurement means for obtaining an averaged Q-factor parameter1, which is an optical signal quality parameter calculated from the optical signal amplitude histogram obtained by said optical signal amplitude histogram measurement means;

optical signal to optical noise power measurement means for measuring optical signal to optical noise power from a second optical signal under measurement obtained by splitting the optical signal under measurement in said optical splitting means;

waveform distortion parameter measurement means for obtaining a waveform distortion parameter, which is another optical signal quality parameter calculated, from the optical signal amplitude histogram obtained by said optical signal amplitude histogram measurement means;

optical signal-to-noise ratio parameter obtaininq means for obtaining an optical signal-to-noise ratio parameter, which is another optical signal quality parameter from the optical signal to optical noise power obtained by said optical signal to optical noise power measurement means;

initial state storing means for storing into a storage medium at least one of an initial value and initial characteristic of the averaged Q-factor parameter, that of the waveform distortion parameter, and that of the optical signal-to-noise ratio parameter at a system installation without optical signal quality degradation, which are obtained using said averaged Q-factor parameter evaluation measurement means, said waveform distortion parameter evaluation measurement means and said optical signal-to-noise ratio parameter obtaining means; and optical signal quality evaluation means for evaluating an optical signal quality degradation factor using a measurement value of the averaged Q-factor parameter obtained by said averaged Q-factor parameter measurement means, a measurement value of the waveform distortion parameter obtained by said waveform distortion parameter measurement means, and a measurement value of the optical signal-to-noise ratio parameter obtained by said optical signal-to-noise ratio parameter obtaining means, and at least one of the initial values and initial characteristics of the averaged Q-factor parameter, the waveform distortion parameter, and the optical signal-to-noise ratio parameter at the system installation without optical signal quality degradation, which are stored into the storage medium by said initial state storing means, wherein said optical signal quality evaluation means makes a decision as to whether a main factor of the optical signal quality degradation is the degradation in the optical signal-to-noise ratio, the waveform distortion or not by determining and evaluating all the averaged Q-factor parameter, the waveform distortion parameter and the optical signal-to-noise ratio parameter.

24. The system for determining the origin of optical signal quality degradation as claimed in any one of claims 16–23, wherein said optical signal amplitude histogram measurement means comprises:
  opto-electric conversion means for converting the optical signal under measurement with a bit rate of $f_0$ (bits per second) into an electric intensity modulated signal;
  electrically sampling means for sampling the electric intensity modulated signal obtained by said opto-electric conversion means with a sampling clock having a repetition frequency of $$f_1(\text{Hz}) = \frac{n}{m} * f_0 + a,$$

where n and m are natural numbers, and a is an offset frequency; and
  histogram evaluation means for obtaining an optical signal intensity distribution from the sampled signal obtained by said electrical sampling means, and of obtaining the optical signal amplitude histogram from the optical signal intensity distribution within an average time period.

25. The system for determining the origin of optical signal quality degradation as claimed in any one of claims 16–23, wherein said optical signal amplitude histogram measurement means comprises:
  optical combining means for combining the optical signal under measurement of a bit rate $f_0$ (bits per second) with a sampling optical pulse train whose repetition frequency is $$f_1(\text{Hz}) = \frac{n}{m} * f_0 + a,$$

where n and m are natural numbers, and a is an offset frequency, and whose pulse width is substantially narrower than a time slot with a bit rate of $f_0$ (bits per second);
  cross-correlation optical signal generating means for obtaining a cross-correlation optical signal by providing the combined light which is combined in said optical combining means into a nonlinear optical medium for inducing nonlinear interaction between the optical signal under measurement and the sampling optical pulse train;
  optical splitting means for splitting the cross-correlation optical signal obtained by said cross-correlation optical signal generating means from the optical signal under measurement and the sampling optical pulse train;
  opto-electric conversion means for converting the cross-correlation optical signal, which is obtained by said splitting in said optical splitting means, into an electric intensity modulated signal; and
  histogram evaluation means for obtaining an optical signal intensity distribution from the electric intensity modulated signal obtained by said opto-electric conversion means, and of obtaining the optical signal amplitude histogram from the optical signal intensity distribution within the average time period.

26. The system for determining the origin of optical signal quality degradation as claimed in any one of claims 16–23, wherein said optical signal amplitude histogram measurement means comprises:
  optical gating means for sampling the optical signal under measurement with a bit rate of $f_0$ (bits per second) by with a sampling clock, said sampling clock having a repetition frequency of $$(\text{Hz}) = \frac{n}{m} * f_0 + a,$$

where n and m are natural numbers, and a is an offset frequency;
  opto-electric conversion means for converting the sampled optical signal obtained by said optical gating means into a sampled electric signal; and
  histogram evaluation means for obtaining an optical signal intensity distribution from the sampled electric signal obtained by said opto-electric conversion means, and of obtaining the optical signal amplitude histogram from the optical signal intensity distribution within an average time period.

27. The system for determining the origin of optical signal quality degradation as claimed in any one of claims 16, 17 and 20–23, wherein said averaged Q-factor parameter measurement means and said waveform distortion parameter measurement means comprise:
  means for estimating an amplitude histogram distribution function g1 associated with a "level 1" from a portion of the amplitude histogram greater than a first predetermined intensity threshold value;
  means for estimating an amplitude histogram distribution function g0 associated with a "level 0" from a portion of the amplitude histogram less than a second predetermined intensity threshold value;
  means for obtaining mean intensity values and standard deviations of the "level 1" and the "level 0" from the functions g1 and g0;
  means for calculating the averaged Q-factor parameter as a ratio of a difference between the mean intensity values of the "level 1" and the "level 0" to the sum of the standard deviations of the "level 1" and the "level 0"; and
  means for adopting at least one of the standard deviation of the "level 1", the standard deviation of the "level 0" and the difference between the mean intensity values of the "level 1" and the "level 0" as the waveform distortion parameter.

28. The system for determining the origin of optical signal quality degradation as claimed in any one of claims 16, 17 and 20–23, wherein said optical signal amplitude histogram measurement means comprises:
  opto-electric conversion means for converting the optical signal under measurement with a bit rate of $f_0$ (bits per second) into an electric intensity modulated signal;
  electric sampling means for sampling the electric intensity modulated signal obtained by said opto-electric conversion means with a sampling clock having a repetition frequency of $$f_1(\text{Hz}) = \frac{n}{m} * f_0 + a,$$

where n and m are natural numbers, and a is an offset frequency; and
  histogram evaluation means for obtaining an optical signal intensity distribution from the sampled signal obtained by said electrically sampling means, and of obtaining the optical signal amplitude histogram from the optical signal intensity distribution within an average time period; and wherein said averaged Q-factor parameter measurement means and said waveform distortion parameter measurement means comprise:

means for estimating an amplitude histogram distribution function g1 associated with a "level 1" from a portion of the amplitude histogram greater than a predetermined intensity threshold value, means for estimating an amplitude histogram distribution function g0 associated with a "level 0" from a portion of the amplitude histogram less than a second predetermined intensity threshold value, means for obtaining mean intensity values and standard deviations of the "level 1" and the "level 0" from the functions g1 and g0, means for calculating the averaged Q-factor parameter as a ratio of a difference between the mean intensity values of the "level 1" and the "level 0" to the sum of the standard deviations of the "level 1" and the "level 0, and means for adopting at least one of the standard deviation of the "level 1", the standard deviation of the "level 0", and the difference between the mean intensity values of the "level 1" and the "level 0" as the waveform distortion parameter.

29. The system for determining the origin of optical signal quality degradation as claimed in any one of claims 16, 17 and 20–23, wherein said optical signal amplitude histogram measurement means comprises:

optical combining means for combining the optical signal under measurement of a bit rate $f_0$ (bits per second) with a sampling optical pulse train whose repetition frequency is $$f_1(\text{Hz}) = \frac{n}{m} * f_0 + a,$$

where n and m are natural numbers, and a is an offset frequency, and whose pulse width is substantially narrower than a time slot with a bit rate of $f_0$ (bits per second);

cross-correlation optical signal generating means for obtaining a cross-correlation optical signal by providing the combined light which is combined in said optical combining means into a nonlinear optical medium for inducing nonlinear interaction between the optical signal under measurement and the sampling optical pulse train;

optical splitting means for splitting the cross-correlation optical signal obtained by said cross-correlation optical signal generating means from the optical signal under measurement and the sampling optical pulse train;

opto-electric conversion means for converting the cross-correlation optical signal, which is obtained by said splitting in said optical splitting means, into an electric intensity modulated signal; and histogram evaluation means for obtaining an optical signal intensity distribution from the electric intensity modulated signal obtained by said opto-electric conversion means, and of obtaining the optical signal amplitude histogram from the optical signal intensity distribution within the average time period; and wherein said averaged Q-factor parameter measurement means and said waveform distortion parameter measurement means comprise:

means for estimating an amplitude histogram distribution function g1 associated with a "level 1" from a portion of the amplitude histogram greater than a predetermined intensity threshold value, means for estimating an amplitude histogram distribution function g0 associated with a "level 0" from a portion of the amplitude histogram less than another predetermined intensity threshold value, means for obtaining mean intensity values and standard deviations of the "level 1" and the "level 0" from the functions g1 and g0;

means for calculating the averaged Q-factor parameter as a ratio of a difference between the mean intensity values of the "level 1" and the "level 0" to the sum of the standard deviations of the "level 1" and the "level 0", and means for adopting at least one of the standard deviation of the "level 1", the standard deviation of the "level 0", and the difference between the mean intensity values of the "level 1" and the "level 0" as the waveform distortion parameter.

30. The system for determining the origin of optical signal quality degradation as claimed in any one of claims 16, 17 and 20–23, wherein said optical signal amplitude histogram measurement means comprises:

optical gating means for sampling the optical signal under measurement with a bit rate of $f_0$ (bits per second) by a sampling clock, said sampling clock generating means having a repetition frequency of $$f_1(\text{Hz}) = \frac{n}{m} * f_0 + a,$$

where n and m are natural numbers, and a is an offset frequency;

opto-electric conversion means for converting the sampled optical signal obtained by said optical gating means into a sampled electric signal; and histogram evaluation means for obtaining an optical signal intensity distribution from the sampled electric signal obtained by said opto-electric conversion means, and of obtaining the optical signal amplitude histogram from the optical signal intensity distribution within an average time period; and wherein said averaged Q-factor parameter measurement means and said waveform distortion parameter measurement means comprise:

means for estimating an amplitude histogram distribution function g1 associated with a "level 1" from a portion of the amplitude histogram greater than a first predetermined intensity threshold value, means for estimating an amplitude histogram distribution function g0 associated with a "level 0" from a portion of the amplitude histogram less than a second predetermined intensity threshold value, means for obtaining mean intensity values and standard deviations of the "level 1" and the "level 0" from the functions g1 and g0, means for calculating the averaged Q-factor parameter as a ratio of a difference between the mean intensity values of the "level 1" and the "level 0" to the sum of the standard deviations of the "level 1" and the "level 0", and means for adopting at least one of the standard deviation of the "level 1", the standard deviation of the "level 0" and the difference between the mean intensity values of the "level 1" and the "level 0" as the waveform distortion parameter.

* * * * *